(12) United States Patent
Yang et al.

(10) Patent No.: US 12,474,719 B2
(45) Date of Patent: Nov. 18, 2025

(54) CLEANER STATION AND CLEANER SYSTEM INCLUDING THE SAME

(71) Applicant: LG Electronics Inc., Seoul (KR)

(72) Inventors: Ingyu Yang, Seoul (KR); Jinhyouk Shin, Seoul (KR); Sungjun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 18/248,338

(22) PCT Filed: Oct. 6, 2021

(86) PCT No.: PCT/KR2021/013684
§ 371 (c)(1),
(2) Date: Nov. 27, 2023

(87) PCT Pub. No.: WO2022/075734
PCT Pub. Date: Apr. 14, 2022

(65) Prior Publication Data
US 2024/0118708 A1   Apr. 11, 2024

(30) Foreign Application Priority Data
Oct. 8, 2020   (KR) .......... 10-2020-0130064

(51) Int. Cl.
*G05D 1/247*    (2024.01)
*A47L 9/00*     (2006.01)
(Continued)

(52) U.S. Cl.
CPC ............ *G05D 1/247* (2024.01); *A47L 9/0063* (2013.01); *A47L 9/2852* (2013.01); *A47L 9/2857* (2013.01);
(Continued)

(58) Field of Classification Search
CPC ............... G05D 1/247; G05D 2107/40; G05D 2105/10; A47L 9/0063; A47L 9/2852
(Continued)

(56) References Cited

U.S. PATENT DOCUMENTS 10,786,129 B1 *   9/2020   Ebrahimi Afrouzi ........................ A47L 9/2873
2020/0081453 A1 *   3/2020   Kwak ........................ A47L 9/28
(Continued)

FOREIGN PATENT DOCUMENTS

CN    106923739 A    7/2017
EP    3033983 B1    6/2017
(Continued)

OTHER PUBLICATIONS

Extended European Search Report in European Appln. No. 21877985.8, mailed on Jun. 26, 2024, 7 pages.
(Continued)

*Primary Examiner* — Yazan A Soofi
(74) *Attorney, Agent, or Firm* — Fish & Richardson P.C.

(57) ABSTRACT

A cleaner system includes: a cleaner; and a cleaner station which collects and removes dust discharged from a dust bin of the cleaner. The cleaner includes a first cleaner which performs manually a cleaning operation by a user, and a second cleaner which performs the cleaning operation while
(Continued)

autonomously driving. The cleaner station includes: a housing which has one side coupled to the cleaner and has an inner space where the dust is collected; and a display unit which is disposed on the housing and outputs position information including a moving path of each of the first cleaner and the second cleaner transmitted from the first cleaner and the second cleaner by wireless communication during a cleaning operation.

20 Claims, 21 Drawing Sheets

(51) Int. Cl.
*A47L 9/28* (2006.01)
*G05D 1/648* (2024.01)
*G05D 105/10* (2024.01)
*G05D 107/40* (2024.01)

(52) U.S. Cl.
CPC ............ *A47L 9/2873* (2013.01); *A47L 9/2894* (2013.01); *G05D 1/648* (2024.01); *A47L 2201/022* (2013.01); *A47L 2201/024* (2013.01); *A47L 2201/04* (2013.01); *G05D 2105/10* (2024.01); *G05D 2107/40* (2024.01)

(58) Field of Classification Search
USPC ............................................................ 701/25
See application file for complete search history.

(56) References Cited

U.S. PATENT DOCUMENTS

| 2020/0329933 | A1* | 10/2020 | Hackert | ................ | A47L 7/0038 |
| 2021/0010685 | A1* | 1/2021 | Hackert | ................ | A47L 9/2873 |
| 2023/0404344 | A1* | 12/2023 | Kim | ....................... | A47L 9/1409 |

FOREIGN PATENT DOCUMENTS

| JP | 2016-116850 | 6/2016 |
| KR | 10-1192540 | 10/2012 |
| KR | 10-2014-0128021 | 10/2014 |
| KR | 10-2019-0088115 | 7/2019 |
| KR | 10-2020-0074055 | 6/2020 |

OTHER PUBLICATIONS

International Search Report and Written Opinion in International Appln. No. PCT/KR2021/013684, mailed on Jan. 10, 2022, 8 pages (with English translation).

* cited by examiner

CLEANER STATION AND CLEANER SYSTEM INCLUDING THE SAME

CROSS-REFERENCE TO RELATED APPLICATIONS

This application is a National Stage application under 35 U.S.C. § 371 of International Application No. PCT/KR2021/013684, filed on Oct. 6, 2021, which claims the benefit of Korean Application No. 10-2020-0130064, filed on Oct. 8, 2020. The disclosures of the prior applications are incorporated by reference in their entirety.

TECHNICAL FIELD

The present disclosure relates to a cleaner station and a cleaner system including the same, and more particularly to a cleaner station which is capable of wirelessly communicating with cleaners constituting the cleaner system and functions as a communication hub, and cleaner system including the cleaner station.

BACKGROUND ART

In general, a cleaner is a home appliance which sucks small garbage or dust in a way of sucking air by using electricity and fills the garbage or dust in a dust bin included in the cleaner product. The cleaner is usually called a vacuum cleaner.

Such a cleaner can be divided into a manual cleaner which performs cleaning by being moved directly by a user and an automatic cleaner which performs cleaning while travels by itself. The manual cleaner can be divided into a canister vacuum cleaner, an upright vacuum cleaner, a hand vacuum cleaner, and a stick vacuum cleaner, etc., in accordance with the shape thereof.

In the past, the canister vacuum cleaner has been used widely as a household cleaner. However, recently, the hand vacuum cleaner and the stick vacuum cleaner, which include a dust bin formed integrally with the body of the cleaner and provides improved convenience for use, tend to be used a lot.

In the case of the canister vacuum cleaner, the body and the suction port thereof are connected by a rubber hose or pipe. In some cases, the cleaner can be used in such a way that a brush is inserted into the suction port.

The hand vacuum cleaner has the maximized portability, and thus, has a light weight and a short length. Therefore, the cleaning area of the cleaner may be limited. Accordingly, the hand vacuum cleaner is used to clean a local place such as on a desk or sofa, the inside of a vehicle.

The stick vacuum cleaner allows a user to use itself with a standing posture, and thus, the cleaning can be made without bending his/her waist forward. As a cordless vacuum cleaner, it is advantageous for cleaning while moving over a wide area. While the handy vacuum cleaner cleans a narrow space, the stick vacuum cleaner is able to clean a wider space than the narrow space and to clean a high place out of reach. Recently, the stick vacuum cleaner is provided in the form of a module, so that the type of the cleaner is actively changed according to various objects.

Also, recently, a robot vacuum cleaner that performs cleaning by itself without a user's operation is being used. The robot vacuum cleaner sucks foreign substances such as dust, etc., on the floor while traveling by itself in an area to be cleaned, thereby automatically cleaning the area to be cleaned.

However, in the conventional stick vacuum cleaner and the conventional robot vacuum cleaner, since the dust bin that stores the collected dust has a small capacity, it is inconvenient for the user to empty the dust bin every time.

With regard to this, as a prior art document related to a stick vacuum cleaner that processes collected dust, Korean Patent Application No. 10-2020-0074001 is disclosed.

The prior art document includes a vacuum cleaner including a dust collection container which collects foreign substances, and a docking station which is connected to the dust collection container in order to remove the foreign substances collected in the dust collection container. The dust collection container is docked to the docking station. The docking station is configured to include a suction device for sucking the foreign substances and internal air within the dust collection container docked to the docking station. In addition, according to the prior art document, a collector that collects the foreign substances within the docking station is included.

On the other hand, even though the stick vacuum cleaner and the robot vacuum cleaner have improved user convenience, it is difficult to perform cleaning perfectly with only one vacuum cleaner due to technical problems, limitations according to structural shapes, etc.

More specifically, while the stick vacuum cleaner has the advantage of being able to clean even in a narrow space while moving as a user desires, the user has the inconvenience of manually performing a cleaning operation with the stick vacuum cleaner. In addition, the robot vacuum cleaner performs the cleaning operation by autonomous driving, which provides convenience to the user. However, the robot vacuum cleaner is not able to clean an area smaller than the volume of the robot vacuum cleaner itself. Also, when the robot vacuum cleaner fails to avoid obstacles, the robot vacuum cleaner cannot perform the cleaning operation or cannot return to a charging base.

That is, the stick vacuum cleaner and the robot vacuum cleaner need to form a relationship to share and complement information on their cleaning operations. If such information is provided to the user, convenience for cleaning and cleaning efficiency can be maximized.

Accordingly, the present disclosure proposes a method in which a cleaner station provided to empty the dust in the dust bins of the stick vacuum cleaner and the robot vacuum cleaner is configured to function as a communication hub, so that information sharing becomes possible between the stick vacuum cleaner, the robot vacuum cleaner, and the cleaner station.

DISCLOSURE

Technical Problem

The purpose of the present disclosure is to accurately identify obstacle information in a room cleaned by a robot vacuum cleaner and to transmit the obstacle information to the robot vacuum cleaner, thereby increasing the cleaning efficiency of the robot vacuum cleaner and preventing the robot vacuum cleaner from colliding with the obstacle when the robot vacuum cleaner returns to the charging base.

Another purpose of the present disclosure is to identify information on an uncleaned area that has not been cleaned by the robot vacuum cleaner and to allow a user to easily identify the information on the uncleaned area.

Further another object of the present disclosure is to improve user convenience by optimizing the arrangement of a display unit of a cleaner station.

Yet another object of the present disclosure is to improve user convenience and to ensure the structural stability of the cleaner station by optimizing the arrangement of an operation unit of the cleaner station.

Technical Solution

One embodiment is a cleaner system including: a cleaner; and a cleaner station which collects and removes dust discharged from a dust bin of the cleaner. The cleaner may include a first cleaner which performs manually a cleaning operation by a user, and a second cleaner which performs the cleaning operation while autonomously driving. The cleaner station may include: a housing which has one side coupled to the cleaner and has an inner space where the dust is collected; and a display unit which is disposed on the housing and outputs position information including a moving path of each of the first cleaner and the second cleaner transmitted from the first cleaner and the second cleaner by wireless communication during a cleaning operation.

The housing may be formed in a quadrangular column shape having a major axis in an up and down direction. The display unit may be disposed on a top surface of the housing.

The cleaner station may store in advance drawing information including a structure of a room in which the cleaner station is installed.

The cleaner station may communicate wirelessly with at least one home appliance disposed in the room in which the cleaner station is installed, and may update the drawing information by receiving position information of each of the home appliances and may output the updated drawing information to the display unit.

When the first cleaner is performing the cleaning operation, the first cleaner may transmit in real time the position information including the moving path of the first cleaner to the cleaner station. The cleaner station may update the received position information of the first cleaner to the drawing information and may output the updated drawing information to the display unit.

The cleaner station may transmit the drawing information including the updated position information of the first cleaner to the second cleaner.

When the second cleaner is performing the cleaning operation, the second cleaner may transmit in real time the position information including the moving path of the second cleaner to the cleaner station. The cleaner station may update the received position information of the second cleaner to the drawing information and may output the updated drawing information to the display unit.

Another embodiment is a cleaner station which collects and removes dust discharged from a dust bin of a cleaner. The cleaner station may include: a housing which is formed in a quadrangular column shape, has a space formed therein for collecting the dust, and forms a major axis in an up and down direction; a coupling portion which is provided on one surface parallel to the major axis of the housing, the one surface being provided to be recessed for coupling of a portion of the cleaner; a top cover which is coupled to the housing and is disposed on an upper end of the housing in the major axis direction of the housing; and a display unit which outputs an operation state of the cleaner station. The display unit may be disposed on the top cover of the housing or may be disposed on one side of the housing where the coupling portion is provided.

The cleaner station may further include an operation unit which receives a command for operating the cleaner station from a user. The operation unit may be disposed on the top cover.

The housing may be formed to have an open top in the major axis direction. The top cover may be coupled to one side of the open top of the housing through a hinge and may pivot around the hinge.

The hinge may be coupled to a surface opposite to the surface on which the coupling portion is provided.

Advantageous Effect

According to the embodiment of the present disclosure, through the sharing of drawing information by using wireless communication between a cleaner station, a stick vacuum cleaner, and a robot vacuum cleaner, the robot vacuum cleaner can accurately receive obstacle information in a room which is cleaned by the robot vacuum cleaner.

Also, by using the received obstacle information, the cleaning efficiency of the robot vacuum cleaner can be increased and collision with an obstacle can be prevented when the robot vacuum cleaner returns to a charging base.

Also, since the cleaner station is provided with a display unit and drawing information is output on the display unit by using the wireless communication, a user is able to visually and easily identify information on an uncleaned area that has not been cleaned by the robot vacuum cleaner.

Also, the display unit of the cleaner station is disposed on an upper portion of the cleaner station, convenience that allows visibility of the display unit to be increased can be provided.

Also, an operation unit of the cleaner station is disposed such that a direction of pressure applied by a user to the operation unit and a direction of a major axis of the cleaner station are parallel. Accordingly, user convenience can be improved and structural stability of the cleaner station can be ensured.

Also, since a top cover of the cleaner station is provided to be pivotable around a hinge, it is possible to provide convenience when attaching and detaching the stick vacuum cleaner to the cleaner station.

MODE FOR INVENTION

Figure 1:
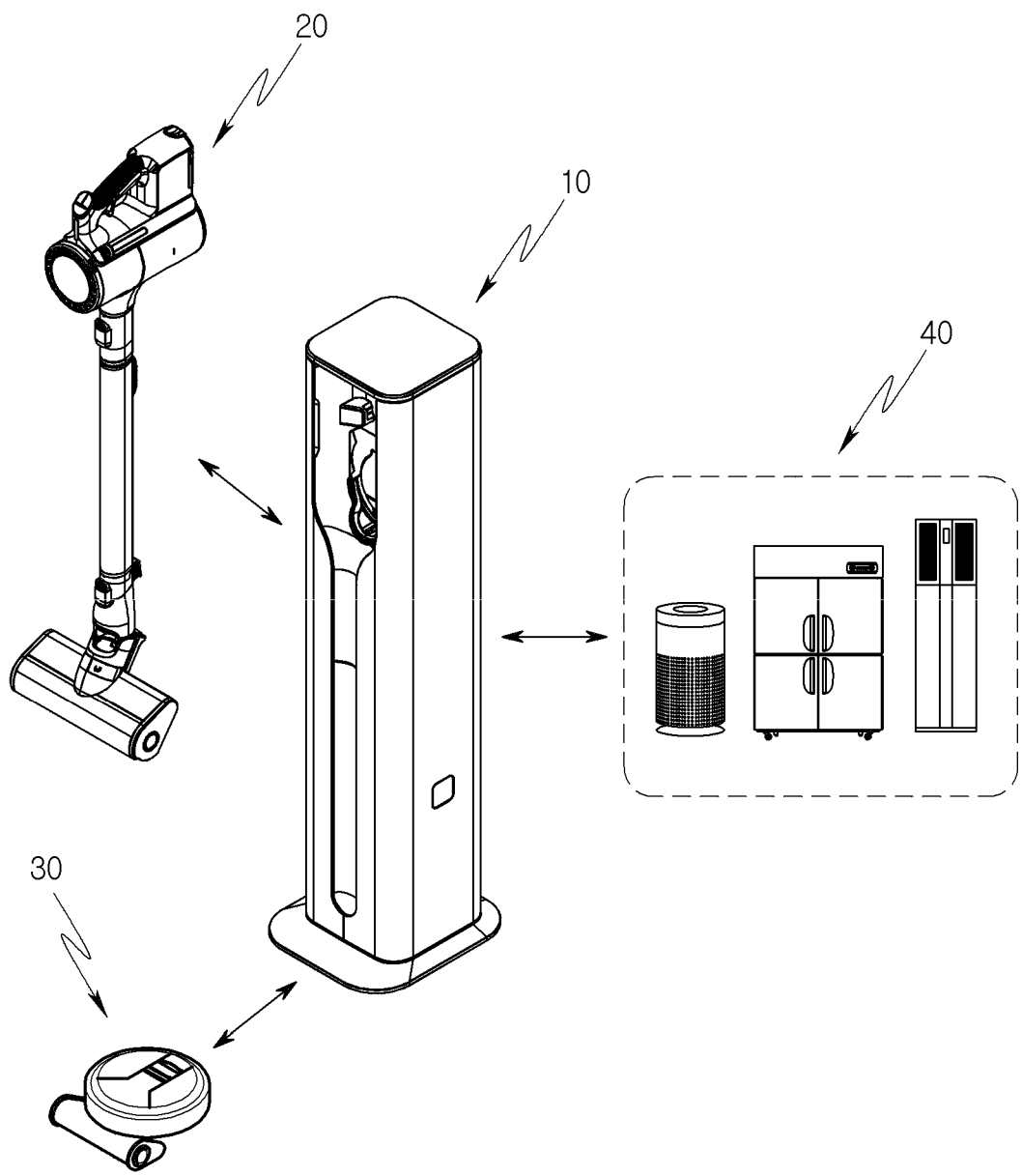
FIG. 1 is a perspective view showing a cleaner system according to an embodiment of the present disclosure.

Hereinafter, preferred embodiments of the present disclosure will be described in detail with reference to the accompanying drawings.

As the present disclosure can have various embodiments as well as can be diversely changed, specific embodiments will be illustrated in the drawings and described in detail. While the present disclosure is not limited to particular embodiments, all modification, equivalents and substitutes included in the spirit and scope of the present disclosure are understood to be included therein.

In the description of the present disclosure, while terms such as the first and the second, etc., can be used to describe various components, the components may not be limited by the terms mentioned above. The terms are used only for distinguishing between one component and other components. For example, the first component may be designated as the second component without departing from the scope of rights of the invention. Similarly, the second component may be designated as the first component.

The term of "and/or" includes a combination or one of a plurality of related items mentioned.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Terms used in the present specification are provided for description of only specific embodiments of the present disclosure, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics.

Unless otherwise defined, all terms used herein including technical and scientific terms have the same meaning as commonly understood by one of ordinary skill in the art to which the present disclosure belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Also, the embodiment is provided for giving those skilled in the art more complete description. Therefore, the shapes and sizes and the like of components of the drawings may be exaggerated for clarity of the description.

Figure 2:
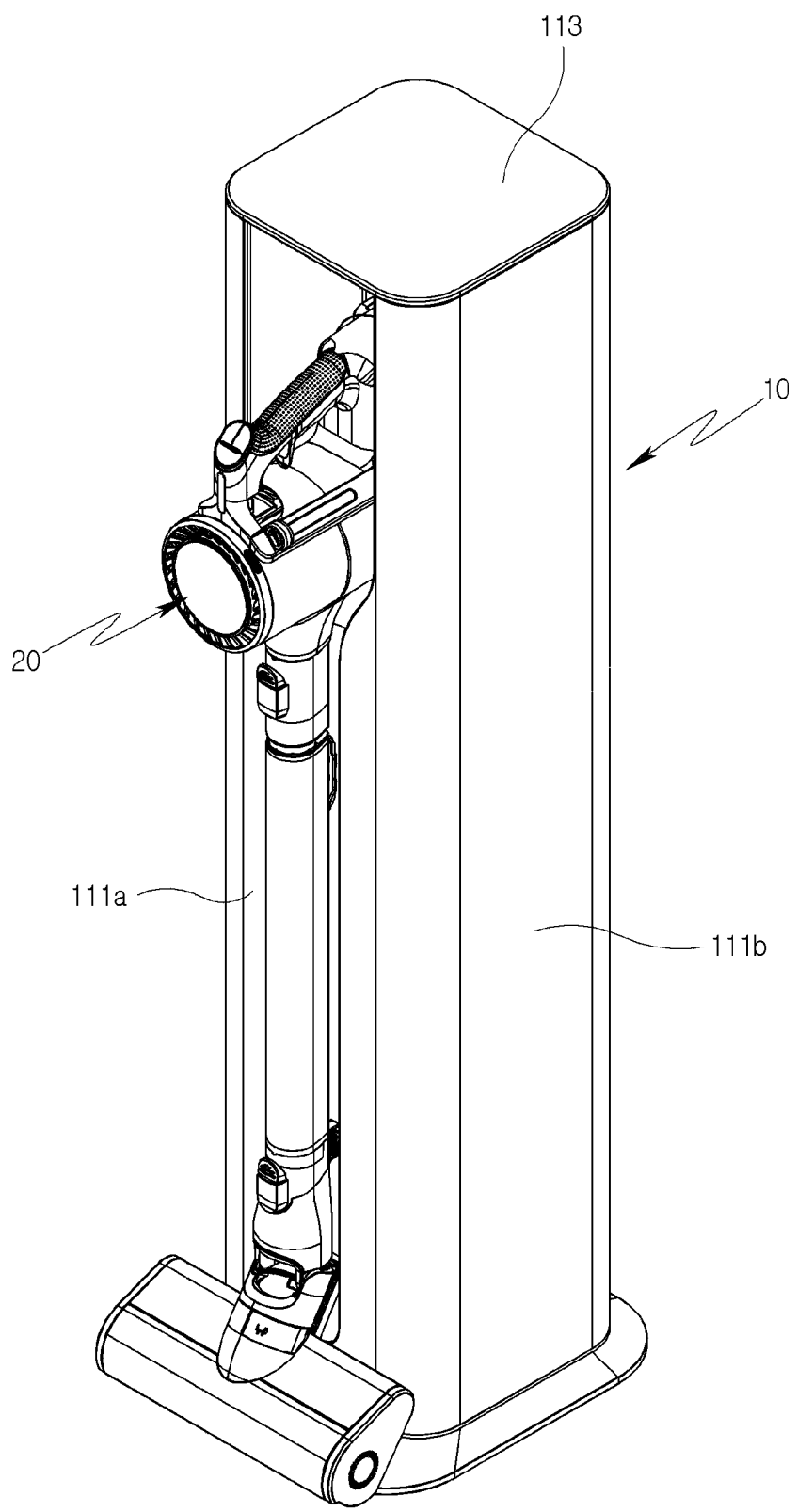
FIG. 2 is a perspective view showing a state where a first cleaner is coupled to a cleaner station.
Figure 3:
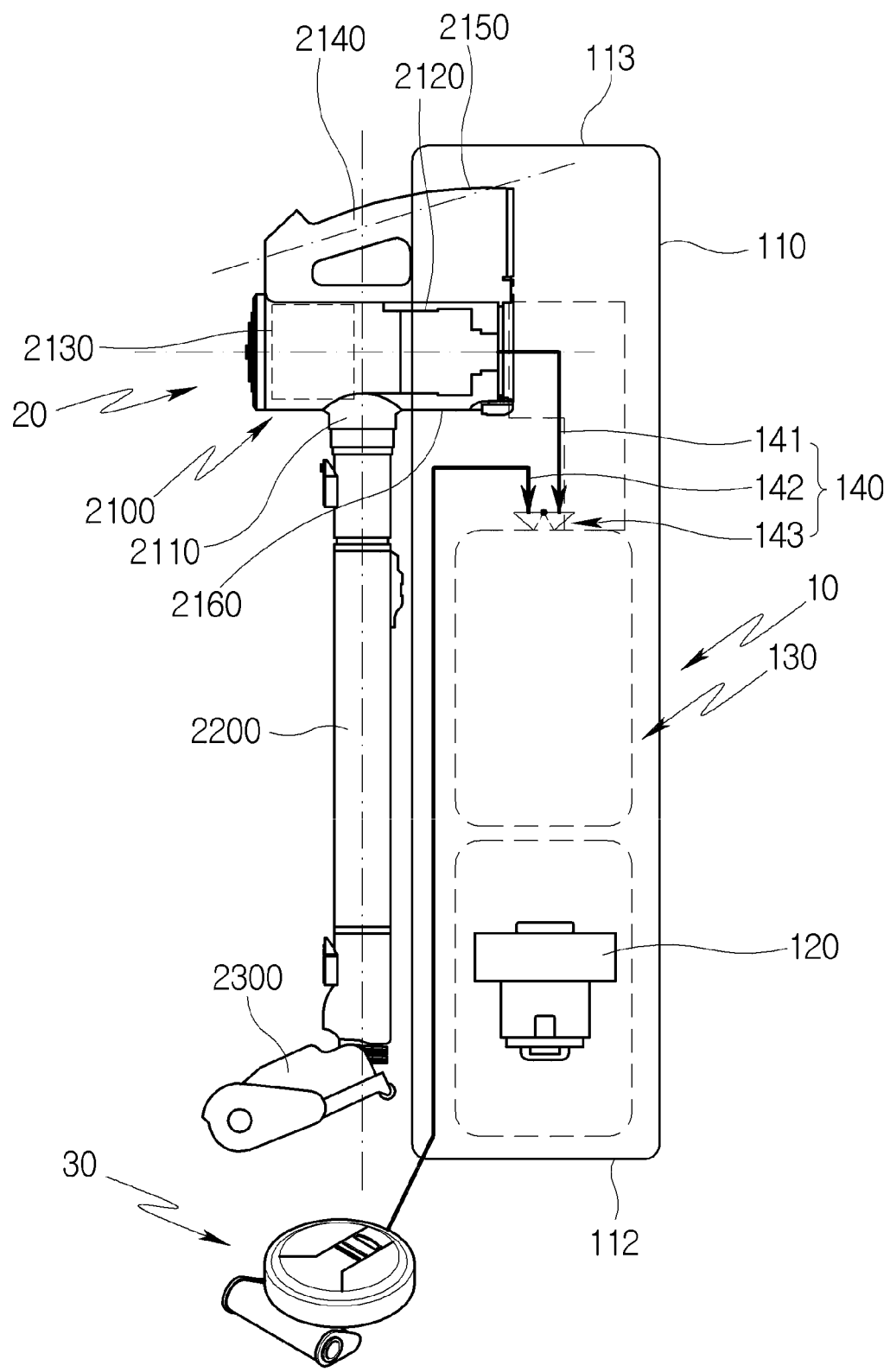
FIG. 3 is a schematic view of a configuration of the cleaner system according to the embodiment of the present disclosure.
Figure 4:
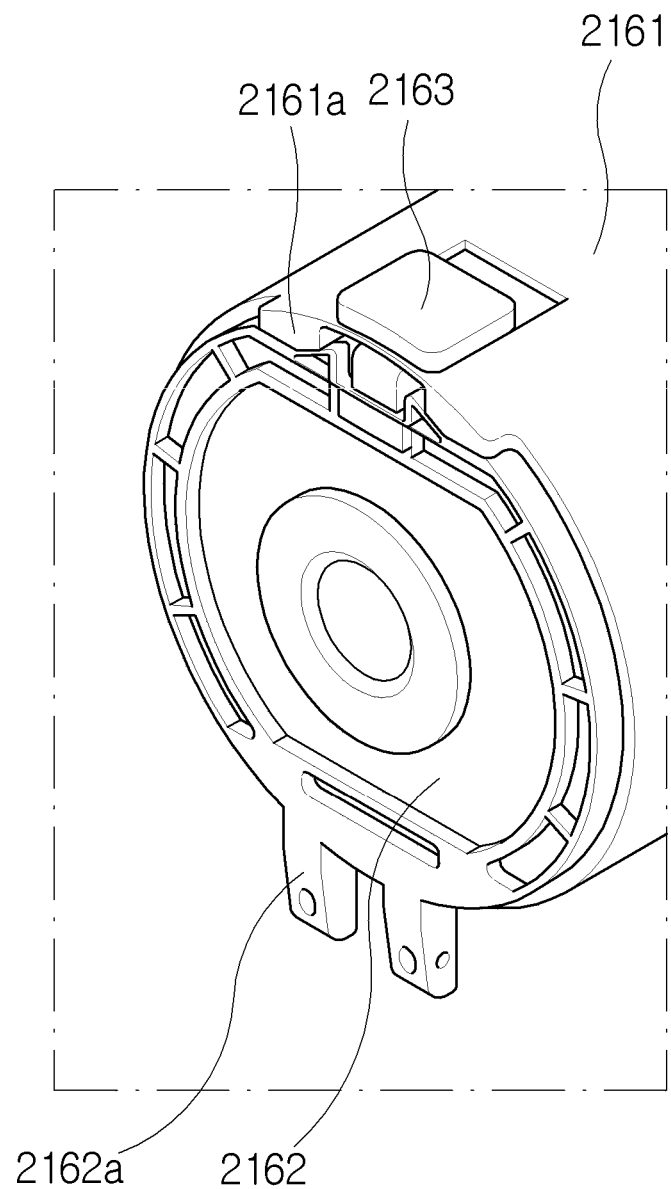
FIG. 4 is an enlarged view of an opening and closing structure of a dust bin of the first cleaner.

FIG. 1 is a perspective view showing a cleaner system according to an embodiment of the present disclosure. FIG. 2 is a perspective view showing a state where a first cleaner is coupled to a cleaner station. FIG. 3 is a schematic view of a configuration of the cleaner system according to the embodiment of the present disclosure. FIG. 4 is an enlarged view of an opening and closing structure of a dust bin of the first cleaner.

Referring to FIGS. 1 to 4, a cleaner system 1 according to the embodiment of the present disclosure may include a cleaner station 10 and cleaners 20 and 30.

The cleaners 20 and 30 may be coupled to the cleaner station 10. Here, the cleaners 20 and 30 may include a first cleaner 20 and a second cleaner 30. Meanwhile, this embodiment may be implemented without some of the components and does not exclude additional components.

The first cleaner 20 and the second cleaner 30 may be disposed in the cleaner station 10. The first cleaner 20 may be coupled to a side surface of the cleaner station 10. Specifically, the first cleaner 20 may include a body 2100, and the body 2100 may be coupled to the side surface of the cleaner station 10. The second cleaner 30 may be coupled to the bottom of the cleaner station 10. The cleaner station 10 may remove dust of a dust bin 2160 of the first cleaner 20. The cleaner station 10 may remove dust of a dust bin (not shown) of the second cleaner 30.

More specifically, the body 2100 of the first cleaner 20 may be coupled to the front of the cleaner station 10.

First, a configuration of the body 2100 of the first cleaner 20 coupled to the cleaner station 10 will be briefly described. The first cleaner 20 may be a stick vacuum cleaner in which a cleaning operation is manually performed by a user.

Referring to FIG. 2, the body 2100 of the first cleaner 20 may include a suction portion 2110 which provides a flow path through which dust-containing air can flow, a dust separator 2120 which communicates with the suction portion 2110 and separates dust sucked into the inside through the suction portion 2110, a suction motor 2130 which generates a suction force for sucking air, a handle 2140 which is gripped by a user, and a battery housing 2150 which receives a battery therein.

Also, the body 2100 of the first cleaner 20 may further include the dust bin 2160.

Here, the dust bin 2160 may communicate with the dust separator 2120 and may store dust separated by the dust separator 2120.

Referring to FIG. 4, the dust bin 2160 may include a dust bin body 2161, an exhaust cover 2162, and a coupling lever 2163.

The dust bin body 2161 may have a cylindrical shape and have open one side. The air introduced through the suction portion 2110 passes through the dust separator 2120 received in the dust bin body 2161. Here, the dust is collected within the dust bin body 2161, and the air separated from the dust flows to the suction motor 2130 and is discharged to the outside of the first cleaner 20. Body protrusions 2161*a* are formed with the coupling lever 2163 interposed therebetween by that the dust bin body 2161 extends from both sides of the coupling lever 2163 in the longitudinal direction thereof.

The exhaust cover 2162 may be rotatably coupled to the open one side of the dust bin body 2161. More specifically, the exhaust cover 2162 may be coupled to the dust bin body 2161 through the medium of a dust bin hinge 2162*a* on open one side of the dust bin body 2161. Here, the dust bin hinge 2162*a* may be disposed on one side close to the battery housing 2150. The exhaust cover 2162 may pivot on the dust bin hinge 2162*a* as an axis in such a way as to open or close the dust bin body 2161.

Also, the exhaust cover 2162 may include, on one side close to the suction portion 2110, a coupling hook (not shown) which is hook-coupled to the dust bin body 2161. The coupling hook and the dust bin hinge 2162*a* may be disposed opposite to each other.

The coupling lever 2163 may be provided to move along the outer circumferential surface of the dust box body 261 in the longitudinal direction of the dust bin body 2161 in order to release the hook-coupling between the exhaust cover 2162 and the dust bin body 2161. The coupling lever 2163 may be disposed downward based on a state in which the first cleaner 20 is coupled to the cleaner station 10. When an external force is applied to the coupling lever 2163 and the coupling lever 2163 moves in the longitudinal direction of the dust bin body 2161 (a direction in which the hook-coupling is released), the coupling hook provided in a shape extending from the exhaust cover 2162 is elastically deformed and then the hook-coupling between the exhaust cover 2162 and the dust bin body 2161 can be released.

Referring to FIG. 3, the first cleaner 20 may further include an extension tube 2200. The extension tube 2200 may communicate with a cleaner head 2300. The extension tube 2200 may communicate with the body 2100 of the cleaner 20. The extension tube 2200 may communicate with the suction portion 2110 of the body 2100. The extension tube 2200 may be formed in a long cylindrical shape.

Referring to FIG. 3, the first cleaner 20 may further include the cleaner head 2300. The cleaner head 2300 may communicate with the extension tube 2200. Therefore, external air may pass through the cleaner head 2300 and the extension tube 2200 by the suction force generated in the body 2100 of the first cleaner 20 and may flow into the body 2100 of the first cleaner 20. Also, dust may be collected to the dust bin 2160.

Hereinafter, the second cleaner 30 coupled to the cleaner station 10 will be briefly described. The second cleaner 30 may be a robot vacuum cleaner that travels autonomously and performs a cleaning operation.

The second cleaner 30 may automatically clean an area to be cleaned by sucking foreign substances such as dust from the floor while autonomously traveling in the area to be cleaned. As will be described later, the second cleaner 30 may include a sensor unit 33 including various sensors for detecting an obstacle, a cliff, and a position, and a drive unit 32 for movement. Here, the drive unit 32 may include a pair of wheels. The second cleaner 30 may be coupled to the cleaner station 10. Dust within the second cleaner 30 may be collected to a dust collector 130 through a second flow path 142 to be described later.

As another example, the second cleaner 30 may automatically clean by wiping foreign substances on the floor by using a wet mop while traveling by itself in an area to be cleaned. Here, the second cleaner 30 may include the sensor unit 33 including various sensors for detecting an obstacle, a cliff, and a position, and the drive unit 32 for movement. Here, the drive unit 32 may include a pair of mop. The second cleaner 30 may be coupled to the cleaner station 10. Here, the pair of mop of the second cleaner 30 may be dried by air discharged from the cleaner station 10.

Next, the cleaner station 10 according to the embodiment of the present disclosure will be described with further reference to FIGS. 2, 3, and 5 to 10.

Figure 5:
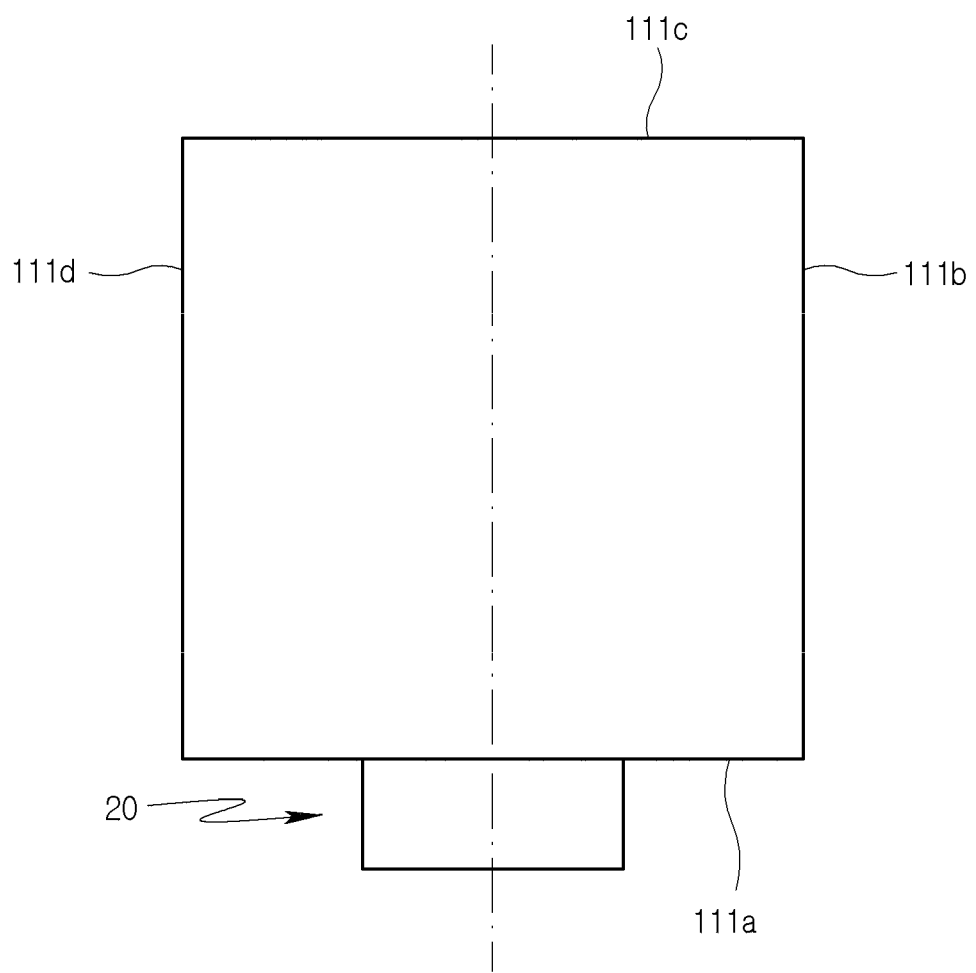
FIG. 5 is a view showing an arrangement relationship between the first cleaner and a housing and an outer wall surface arrangement structure of the housing.
Figure 6:
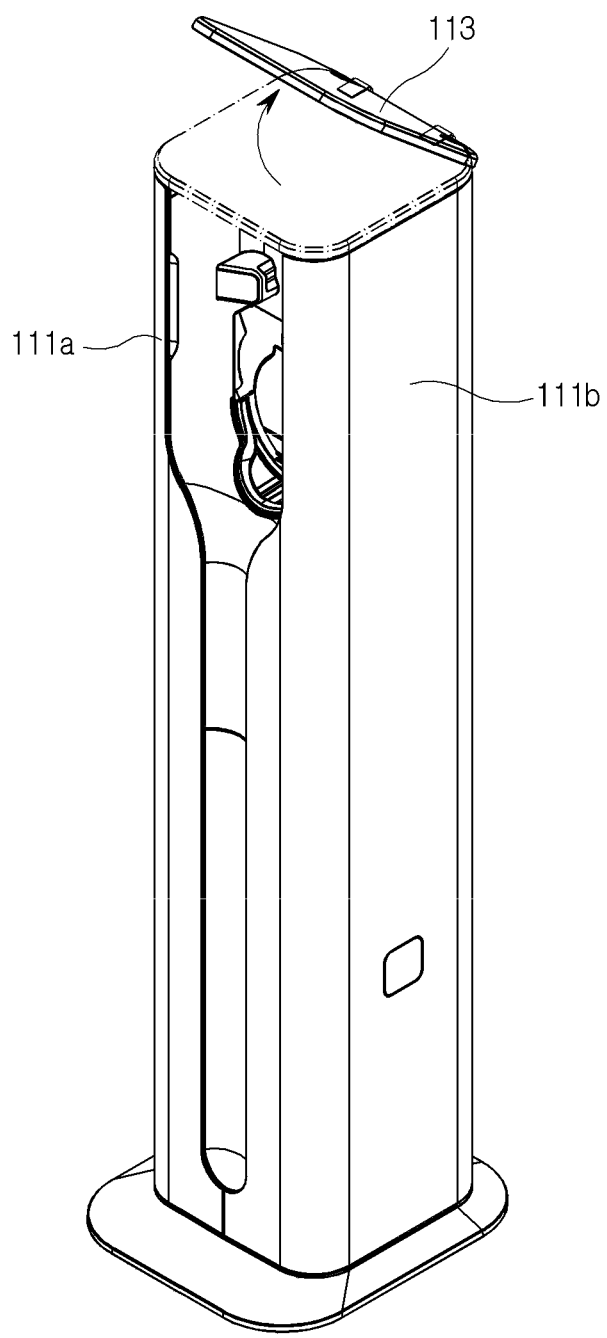
FIG. 6 is a perspective view showing a top cover of the cleaner system and a state where the top cover is opened in accordance with the embodiment of the present disclosure.
Figure 7:
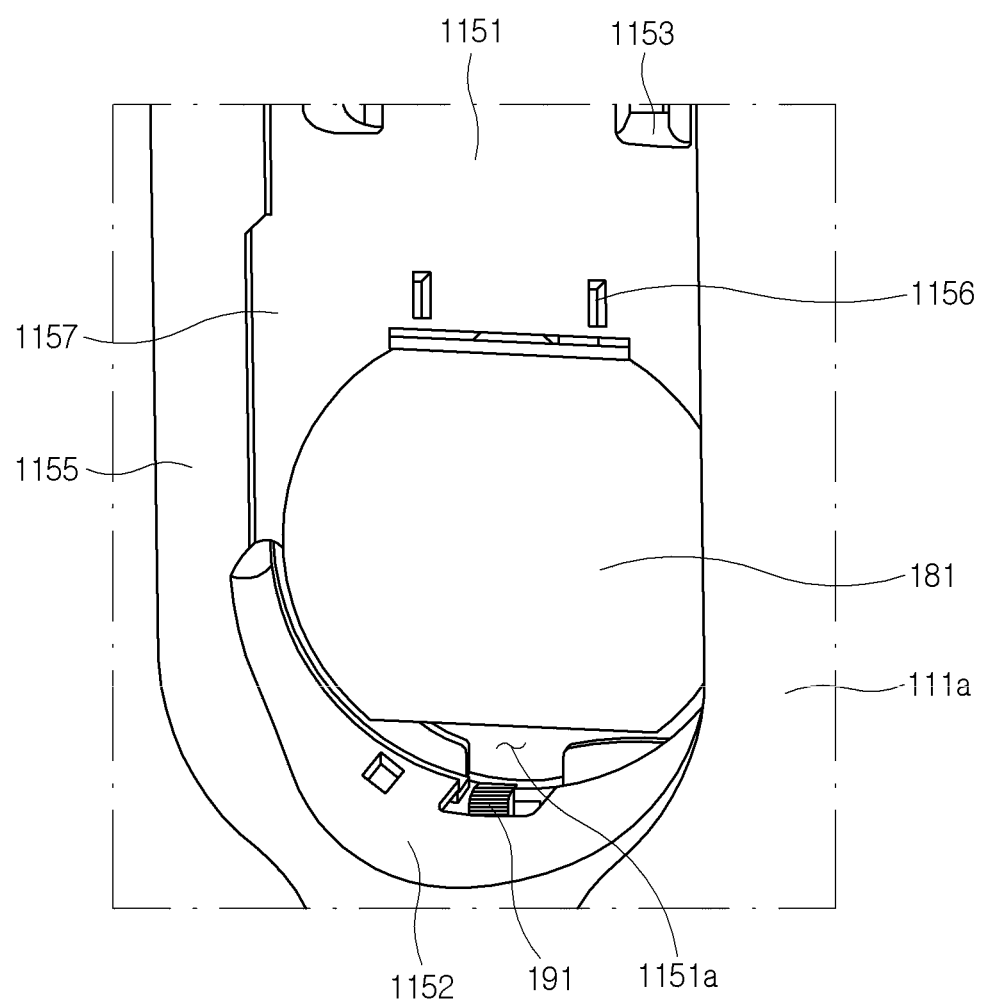
FIG. 7 is an enlarged view of a coupling portion of the cleaner station according to the embodiment of the present disclosure.
Figure 8:
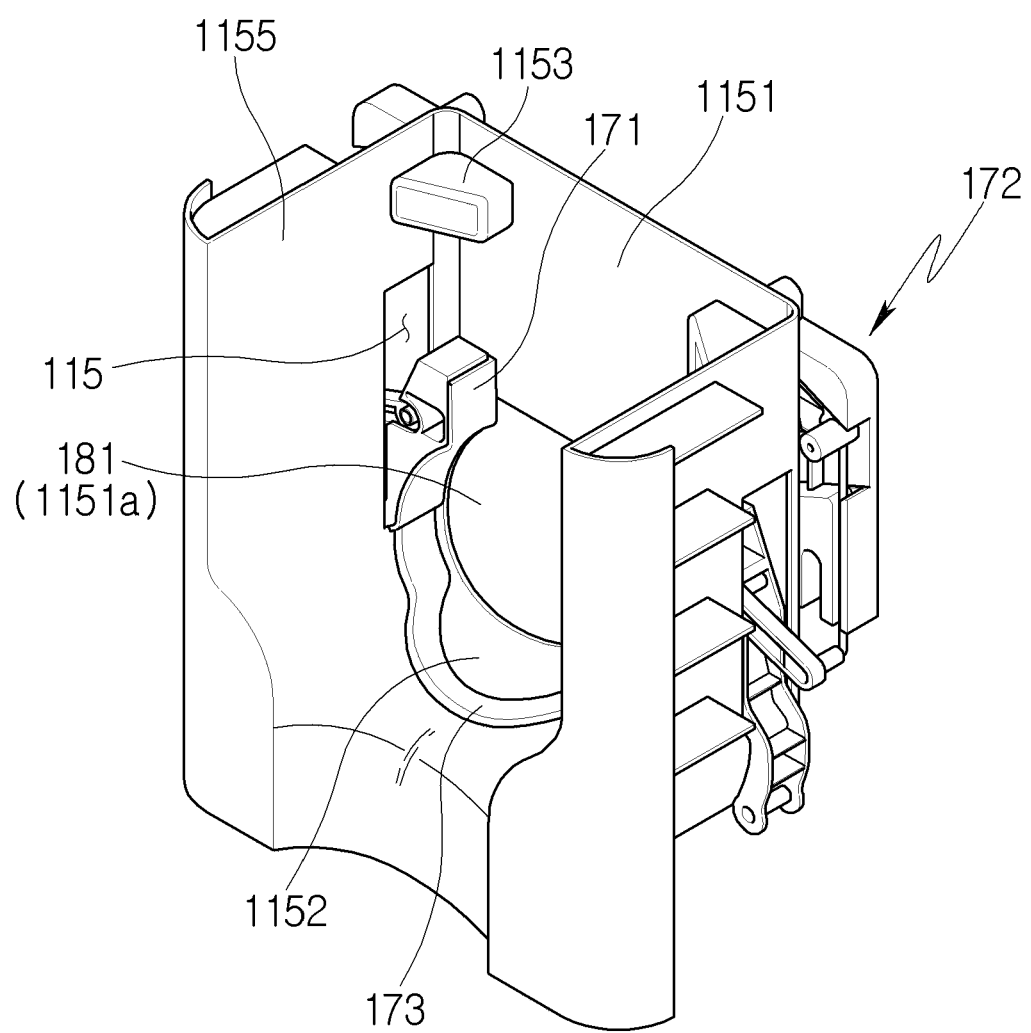
FIG. 8 is an enlarged view showing a state in which a fixing unit of the cleaner station according to the embodiment of the present disclosure is coupled to the coupling portion.
Figure 9:
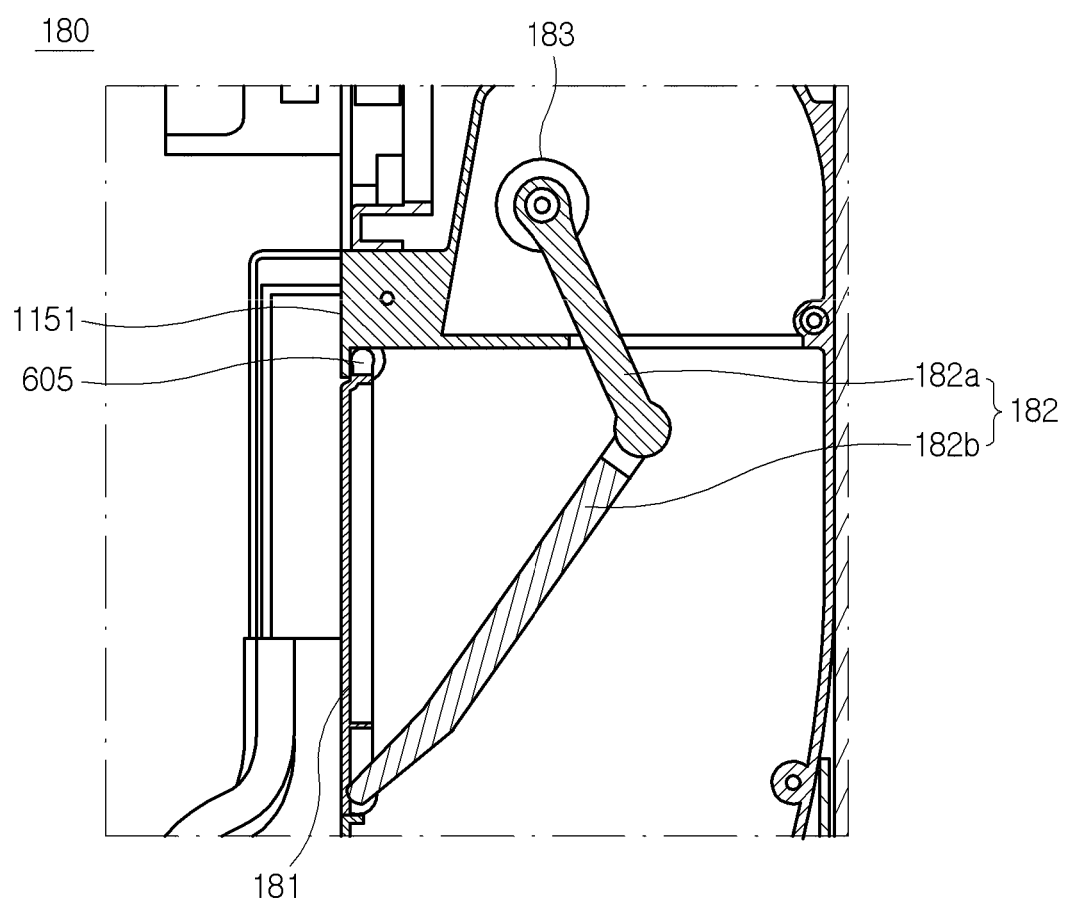
FIG. 9 is an enlarged view of a door unit of the cleaner station according to the embodiment of the present disclosure.
Figure 10:
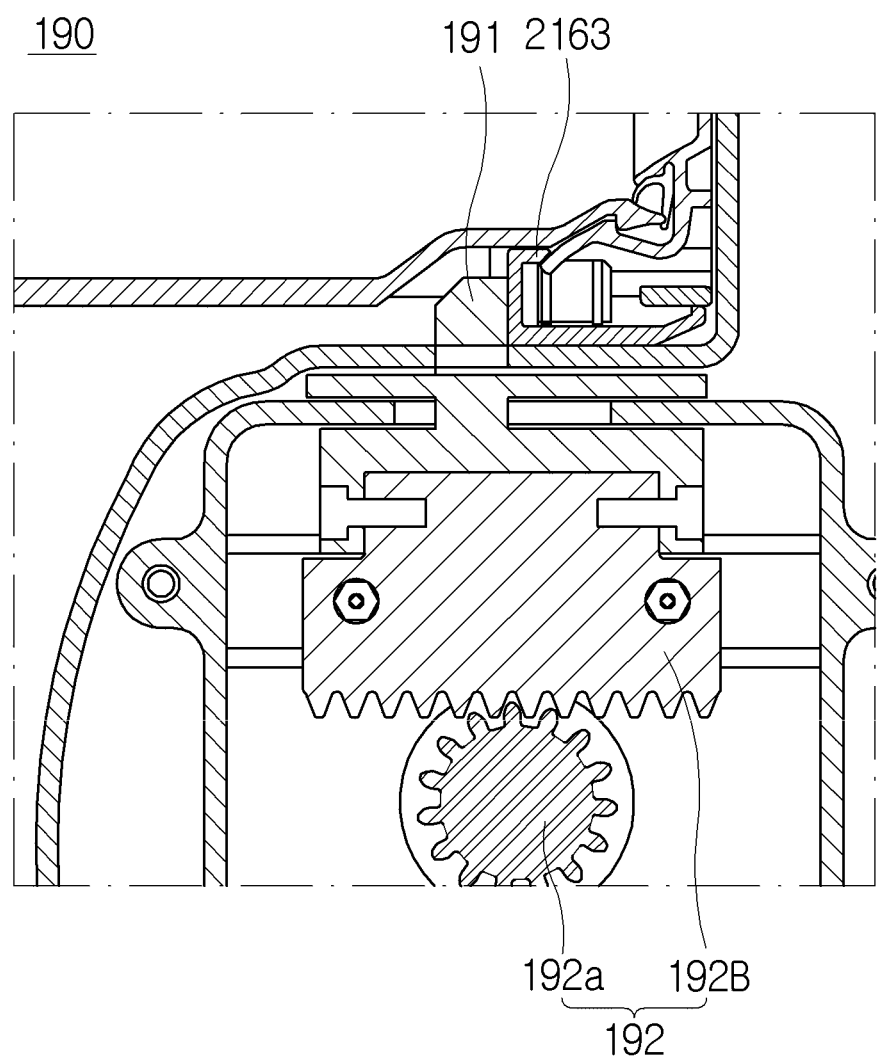
FIG. 10 is an enlarged view of a cover opening unit of the cleaner station according to the embodiment of the present disclosure.

FIG. 5 is a view showing an arrangement relationship between the first cleaner and a housing and an outer wall surface arrangement structure of the housing. FIG. 6 is a perspective view showing a top cover of the cleaner system and a state where the top cover is opened in accordance with the embodiment of the present disclosure. FIG. 7 is an enlarged view of a coupling portion of the cleaner station according to the embodiment of the present disclosure. FIG. 8 is an enlarged view showing a state in which a fixing unit of the cleaner station according to the embodiment of the present disclosure is coupled to the coupling portion. FIG. 9 is an enlarged view of a door unit of the cleaner station according to the embodiment of the present disclosure. FIG. 10 is an enlarged view of a cover opening unit of the cleaner station according to the embodiment of the present disclosure.

Referring to FIGS. 2 and 3, the cleaner station 10 may include a housing 110. The cleaner 20 is coupled to one surface of the housing 110, and the housing 110 may form an external appearance of the cleaner station 10. Specifically, the housing 110 may be formed in a column shape including at least one outer wall surface. For example, the housing 110 may be formed in a quadrangular column shape. Here, the quadrangular column shape may include a case in which a curved surface having a predetermined curvature is formed at each corner of the quadrangular column.

A space may be formed within the housing 110 to receive various components such as a dust collection motor 120, etc., and the housing 110 may collect dust of the dust bin 2160 of the first cleaner 20 to an inside thereof.

The housing 110 may include a ground support portion 112. Here, the ground support 112 may be disposed toward the ground. A bottom surface of the ground support portion 112 in contact with the ground can be disposed to be inclined at a predetermined angle to the ground as well as can be placed parallel to the ground. With this configuration, the dust collection motor 120 received within the housing 110 can be stably supported and the overall weight can be balanced even when the first cleaner 20 is coupled.

Also, the ground support portion 112 may have a plate shape extending from the bottom surface of the housing 110 in such a manner as to increase an area in contact with the ground in order to prevent the cleaner station 10 from falling over and to maintain balance.

As described above, the housing 110 may include at least one outer wall surface. For example, referring to FIG. 5, the housing 110 may include a first outer wall surface 111*a*, that is, a surface on which a coupling portion 115 is formed and may further include a second outer wall surface 111*b*, a third outer wall surface 111*c*, and a fourth outer wall surface 111*d* which are sequentially arranged in a counterclockwise direction in a state where the first outer wall surface 111*a* is viewed.

The housing 110 may be provided openably and closably. For example, when the cleaner station 10 is viewed from the front, a portion of the right side of the first outer wall surface 111*a* and the second outer wall surface 111*b* may be integrally opened in the direction of the second outer wall surface 111b. A portion of the left side of the first outer wall surface 111a and the fourth outer wall surface 111d may be integrally opened in the direction of the fourth outer wall surface 111d.

The coupling portion 115 formed on the first outer wall surface 111a may be formed by that the first outer wall surface 111a is recessed into the inside of the housing 110 in such a way as to correspond to a partial shape in the direction in which the dust bin 2160 of the first cleaner 20 is disposed. With this configuration, a portion of the first cleaner 20 can be coupled to the cleaner station 10 and can be supported by the cleaner station 10.

Also, a structure in which the second cleaner 30 can be coupled may be added to the outer wall surface of the housing 110. For example, a structure corresponding to the shape of the second cleaner 30 may be added to the first outer wall surface 111a. Also, a cleaner bottom plate (not shown) to which a bottom surface of the second cleaner 30 can be coupled may be additionally coupled to the outer wall surface. However, the second cleaner 30 can be coupled not only to the first outer wall surface 111a but also to the second outer wall surface 111b, the third outer wall surface 111c, or the fourth outer wall surface 111d if necessary. In this case, a structure corresponding to the shape of the second cleaner 30 may be added to each outer wall surface.

The cleaner station 10 may further include a top cover 113.

Referring to FIGS. 2 and 6, the top cover 113 may be coupled to the housing 110. More specifically, the top cover 113 may be disposed on a top of the housing 110 in a major axis direction of the housing, and may be coupled to the housing 110.

The housing 110 may be formed to have an open top in the major axis direction. That is, an inner space of the housing 110 and an outside of the housing 110 may communicate with each other at the major axis direction top of the housing 110. The coupling portion 115 to be described later may extend to the open top of the housing 110.

The top cover 113 may be provided to open and close the open top of the housing 110. The top cover 113 may be coupled to the housing 110 through a hinge in order to open and close the housing 110. More specifically, the top cover 113 may be coupled on one side of the open top of the housing 110 through the hinge, and may open and close the housing 110 by pivoting around the hinge. Here, the hinge may be coupled to an outer wall surface which is a surface opposite to the outer wall surface of the housing 110 that is the surface on which the coupling portion 115 is provided. For example, when the coupling portion 115 is provided on the first outer wall surface 111a of the housing 110, the hinge may be coupled to the third outer wall surface 111c. Accordingly, the top cover 113 may open the housing 110 while pivoting in a direction farther away from the first outer wall surface 111a on which the coupling portion 115 is provided.

Through this configuration, when a user attaches the first cleaner 20 to the cleaner station 10, the user can couple the first cleaner 20 to the housing 110 while the top cover 113 is open. Also, when the user detaches the first cleaner 20 from the cleaner station 10, the user can take out the first cleaner 20 from the housing 110 while the top cover 113 is open. Accordingly, when the first cleaner 20 is attached or detached, the unlimited and free range of moving of the first cleaner 20 upward in the major axis direction of the housing 110 can be obtained. In other words, since the first cleaner 20 can be detached and attached without being interfered in a direction of the top of the housing 110, convenience in attaching and detaching the first cleaner 20 can be provided.

The top cover 113 may also form an upper external appearance of the cleaner station while being coupled to the cleaner station 10. That is, the top cover 113 may include a top surface that is disposed on the uppermost side of the cleaner station 10 in the major axis direction and is exposed to the outside.

Here, the top surface of the top cover 113 can be disposed parallel to the ground based on the coupled state to the cleaner station 10 or inclined at a predetermined angle with the ground. Also, the top surface of the top cover 113 can be disposed to be inclined at a predetermined angle.

Hereinafter, the shape of the coupling portion 115 will be described with reference to FIG. 7.

The coupling portion 115 may be provided on one surface parallel to the major axis of the housing 110, and the one surface may be provided to be recessed for coupling of a portion of the first cleaner 20. Here, the one surface to which the first cleaner 20 is coupled may be the first outer wall surface 111a.

The dust bin 2160 and the battery housing 2150 may be coupled to the coupling portion 115. Referring to FIG. 7, the coupling portion 115 may include a coupling surface 1151. The coupling surface 1151 may be placed parallel to the outer wall surface of the housing 110. For example, the coupling surface 1151 may refer to a surface formed in a shape of a groove concave toward the inside of the cleaner station 10 from the first outer wall surface 111a. That is, the coupling surface 1151 may be formed to have a step difference with respect to the first outer wall surface 111a and may be formed in parallel to the major axis of the housing 110.

The coupling surface 1151 may be in contact with the bottom surface of the battery housing 2150 and the dust bin 2160 of the first cleaner 20. Here, the bottom surface of the dust bin 2160 may refer to a surface facing the ground when the user uses the first cleaner 20 or puts it on the ground.

A dust passage hole 1151a may be formed in the coupling surface 1151 in order to allow external air of the housing 100 to flow into the housing. The dust passing hole 1151a may be formed in a hole shape corresponding to the shape of the dust bin 2160 such that the dust of the dust bin 2160 flows into the dust collector 130. Specifically, the dust passage hole 1151a may be formed to correspond to the shape of the exhaust cover 2162 such that, when the exhaust cover 2162 of the dust bin 2160 is opened, the exhaust cover 2162 can pass through. The dust passage hole 1151a may be formed to communicate with a first flow path 141 to be described later.

The coupling portion 115 may include a dust bin guide surface 1152. The dust bin guide surface 1152 may be disposed on the first outer wall surface 111a. The dust bin guide surface 1152 may be connected to the first outer wall surface 111a. Also, the dust bin guide surface 1152 may be connected to the coupling surface 1151.

The dust bin guide surface 1152 may be formed to have a shape corresponding to the outer surface of the dust bin 2160. Through this, it is possible to provide convenience that allows the first cleaner 20 to be coupled to the coupling surface 1151. Also, when the first cleaner 20 is coupled to the cleaner station 10, the dust bin 2160 can be supported by dust bin guide surface 1152.

The coupling portion 115 may include a guide protrusion 1153. The guide protrusion 1153 may be disposed on the coupling surface 1151. The guide protrusion 1153 may protrude from the coupling surface 1151. Two guide protrusions 1153 may be disposed to be spaced apart from each other. A distance between the two guide protrusions 1153 spaced apart from each other may correspond to a width of the battery housing 2150 of the first cleaner 20. Through this, it is possible to provide convenience that allows the first cleaner 20 to be coupled to the coupling surface 1151.

The coupling portion 115 may include a side wall 1155. The side wall 1155 may refer to wall surfaces disposed on both sides of the coupling surface 1151 and may be connected perpendicular to the coupling surface 1151. The side wall 1155 may be connected to the first outer wall surface 111*a*. Also, the side wall 1155 may be connected to the dust bin guide surface 1152. That is, the side wall 1155 may form a surface connected to the dust bin guide surface 1152. Through this, the first cleaner 20 is prevented from shaking left and right, and the cleaner station 10 is able to stably receive the first cleaner 20.

The side wall 1155 may also extend to the major axis direction uppermost end portion of the housing 110 (see FIG. 6). Therefore, in a state where the top cover 113 is coupled to the housing 110, the side wall 1155 may be in contact with the top cover 113. The first cleaner 20 may be moved for attachment and detachment by a user along the direction in which the side wall 1155 is formed. That is, in the case of attaching the first cleaner 20, so as to couple the first cleaner 20 to the coupling portion 115, the user may move the first cleaner toward the dust bin guide surface 1152 from the major axis direction uppermost end portion of the housing 110 in the major axis direction in the form of putting down and inserts the first cleaner 20.

Also, in the case of detaching the first cleaner 20, in order to take out the first cleaner from the coupling portion 115, the user moves the first cleaner 20 from the dust bin guide surface 1152 toward the major axis direction upper portion of the housing 110 in the form of lifting the first cleaner 20.

Meanwhile, as described above, the top cover 113 may be coupled to the housing 110 through the hinge, and the top cover 113 may pivot around the hinge in order to open the top of the housing 110. Accordingly, in the state in which the top cover 113 is open, in order to attach or detach the first cleaner 20 to or from the cleaner station 10, there is no interfering component when the user puts down and inserts the first cleaner on and into the dust bin guide surface 1152 or conversely lifts the first cleaner from the dust bin guide surface 1152. That is, convenience of attaching and detaching the first cleaner 20 may be provided to the user.

The coupling portion 115 may include a coupling sensor 1154. The coupling sensor 1154 may detect whether the first cleaner 20 is coupled to the coupling portion 115.

The coupling sensor 1154 may include a contact sensor. For example, the coupling sensor 1154 may include a micro switch. Here, the coupling sensor 1154 may be disposed on the guide protrusion 1153. Therefore, when the battery housing 2150 of the first cleaner 20 is coupled between a pair of guide protrusions 1153, the coupling sensor 1154 can detect the first cleaner 20 through contact with the battery housing 2150.

Meanwhile, the coupling sensor 1154 may also include a non-contact sensor. For example, the coupling sensor 1154 may include an infrared sensor unit (IR sensor). Here, the coupling sensor 1154 may be disposed on the side wall 1155 and may face the battery housing 2150 or the dust bin 2160 of the first cleaner 20.

The coupling sensor 1154 further detects whether or not power is applied to the battery of the first cleaner 20 as well as detects the first cleaner 20, thereby finally determining whether the first cleaner 20 is coupled to the coupling portion 115.

Here, when the battery is electrically coupled to a charging part 1156, it may be determined that power is applied to the battery. The charging part 1156 may be provided on the coupling surface 1151 and can supply power to the first cleaner 20 when coupled to the battery.

The coupling portion 115 may further include a fixing member entry and exit hole 1157. The fixing member entry and exit hole 1157 may be formed in the form of a long hole along the side wall 1155 such that a fixing member 171 to be described later can enter and exit. For example, the fixing member entry and exit hole 1157 may be a rectangular hole formed along the side wall 1155. Details of the fixing member 171 will be described later together with a fixing unit 170.

Hereinafter, the dust collection motor 120, the dust collector 130, and the suction flow path 140 will be described with reference to FIG. 3.

The cleaner station 10 may further include the dust collection motor 120.

The dust collection motor 120 may be received within the housing 110 and may generate a suction force to suck dust within the dust bin 2160 of the first cleaner 20. Accordingly, a flow of air flowing from the top to the bottom of the cleaner station 10 may be formed.

The cleaner station 10 may further include the dust collector 130.

The dust collector 130 may be received within the housing 110 and may be disposed above the dust collection motor 120. When the dust collector 130 is disposed above the dust collection motor 120 and the dust collection motor 120 generates a suction force, the dust sucked from the inside of the dust bin 2160 of the first cleaner 20 is collected to the dust collector 130.

The dust collector 130 may be coupled to the housing 110 in an attachable and detachable manner. Accordingly, when the housing 110 is opened, the dust collector 130 may be separated from the housing 110 and discarded, and a new dust collector 130 may be coupled to the housing 110. That is, the dust collector 130 may be defined as a consumable part.

When a suction force is generated by the dust collection motor 120, the volume of the dust collector 130 may increase and dust is received in the dust collector. To this end, the dust collector 130 may be made of a material that transmits air but does not transmit foreign substances such as dust. For example, the dust collector 130 may be made of a non-woven fabric material and may have a hexahedral shape based on an increase in volume.

The cleaner station 10 may further include the suction flow path 140. The suction flow path 140 may connect the first cleaner 20 or the second cleaner 30 and the dust collector 130.

The suction flow path 140 may include a first flow path 141, a second flow path 142 and a flow path switching valve 143.

The first flow path 141 may connect the dust collector 130 and the dust bin 2160 of the first cleaner 20. The first flow path 141 is received within the housing 110 between the dust collector 130 and the dust bin 2160 of the first cleaner 20, and may be defined as a space through which air flows such that, when the dust collection motor 120 generates a suction force, the dust within the dust bin 2160 is collected to the dust collector 130.

The first flow path 141 may be a space formed at the back of the dust passage hole 1151*a* and may be a tube that is bent downward in the dust passage hole 1151*a* and allows dust and air to flow therethrough. More specifically, one side end of the first flow path 141 may be coupled to the dust passage hole 1151a and the other side end of the first flow path 141 may be coupled to the dust collector 130. Therefore, when the dust collection motor 120 is driven to generate a suction force, a flow of air flowing from one side end to the other side end of the first flow path 141 occurs, and air which includes foreign substances and flows from the inside of the dust bin 2160 of the first cleaner 20 moves to the dust collector 130 through the first flow path 141. Also, only the foreign substances remain in the dust collector 130 and the air exits the dust collector 130.

The second flow path 142 may connect the second cleaner 30 and the dust collector 130. The dust within the second cleaner 30 may move to the dust collector 130 through the second flow path 142.

The flow path switching valve 143 may be disposed between the dust collector 103 and the first and second flow paths 141 and 142. The flow path switching valve 143 may selectively open and close the first and second flow paths 141 and 142 connected to the dust collector 130. Through this, it is possible to prevent a decrease in suction force caused by the opening of the plurality of flow paths 141 and 142.

Next, a type in which the cleaner station 10 and the first cleaner 20 are coupled will be described.

Referring to FIG. 3, as described above, the first cleaner 20 may be coupled to the front of the housing 110. More specifically, some of the components of the body 2100 of the first cleaner 20 are coupled to the coupling portion 115, so that the entire first cleaner 20 can be mounted on the cleaner station 10. More specifically, when the first cleaner 20 is coupled to the coupling portion 115 of the housing 110, the longitudinal axis of the dust bin 2160 may be arranged parallel to the ground. Also, when the first cleaner 20 is coupled to the coupling portion 115 of the housing 110, the longitudinal axis of the dust bin 2160 may be disposed perpendicular to a major axis of the housing 110. Here, the first cleaner 20 may be mounted such that the longitudinal axis of the suction portion 2110 of the first cleaner 20 and the extension tube 2200 of the first cleaner 20 are disposed parallel to the major axis of the housing 110.

Meanwhile, the first flow path 141 of the cleaner station 10 may extend within the housing 110 in the up and down direction. Accordingly, the dust present in the dust bin 2160 moves along the dust bin body 2161 in a horizontal direction by the suction force of the dust collection motor 120, and enters the first flow path 141. At this time, the flow direction of the dust changes into a vertical direction. The dust is collected to the dust collector 130 received in the lower inner side of the housing 110.

That is, the dust within the dust bin 2160 of the first cleaner 20 may be collected to the dust collector 130 of the cleaner station 10 by the suction force of the dust collection motor 120 and the workings of gravity.

Meanwhile, "coupling" between the cleaners 20 and 30 and the cleaner station 10, which has been repeatedly described throughout this specification, is a concept including physical coupling, electrical coupling, and fluid coupling.

Specifically, taking the first cleaner 20 and the cleaner station 10 as an example, it can be referred to as physical coupling that the first cleaner 20 is seated on the coupling portion 115 by the user, is fixed to and/or sealed to the cleaner station 10 by a mechanical component (e.g., fixing unit 170), and thus, is connected in a state where fluid coupling to be described later is possible.

Also, it can be referred to as electrical coupling that the battery of the first cleaner 20 comes into contact with the charging part 1156 so that the first cleaner 20 and the cleaner station 10 are connected in a state in which the first cleaner 20 can receive power from the cleaner station 10. Alternatively, it can be referred to as electrical coupling that the first cleaner 20 and the cleaner station 10 are connected in a state in which the physical coupling can be detected by sensors such as the coupling sensor 1154.

Also, it can be referred to as fluid coupling that the door 181 to be described later of the cleaner station 10 is opened and the exhaust cover 2162 of the first cleaner 20 is also opened, so that the dust bin 2160 of the first cleaner 20 and the first flow path 141 of the cleaner station 10 are in communication with each other. The fluid coupling is performed after the above-described physical coupling and/or electrical coupling. In the state of fluid coupling, the air within the dust bin 2160 of the first cleaner 20, together with the dust, may pass through the first flow path 141 and may be transferred to the dust collector 130.

Through this configuration, since the dust in the dust bin can be removed without a separate operation of the user, convenience for users can be provided. In addition, it is possible to remove the inconvenience for the user to empty the dust bin each time. Also, the dust can be prevented from scattering during the emptying of the dust bin.

Next, the fixing unit 170, a door unit 180, and the cover opening unit 190 will be described with reference to FIGS. 8 to 10.

The cleaner station 10 may further include the fixing unit 170.

Referring to FIG. 8, a portion of the fixing unit 170 may be disposed on the side wall 1155. Also, another portion of the fixing unit 170 may be disposed behind the coupling surface 1151.

The fixing unit 170 may fix the first cleaner 20 coupled to the coupling surface 1151. More specifically, the fixing unit 170 may fix the battery housing 2150 and the dust bin 2160 of the first cleaner 20 coupled to the coupling surface 1151.

The fixing unit 170 may include the fixing member 171, a fixing portion motor 172, and a fixed sealer 173.

The fixing member 171 may receive power from the fixing portion motor 172 and may perform a reciprocating movement from the inside of the side wall 1155 of the coupling portion 115 toward the dust bin 2160. The fixing member 171 may enter and exit the side wall 1155 through the fixing member entry and exit hole 1157. The upper portion of the fixing member 171 may be formed in a shape corresponding to the shape of the battery housing 2150, and the lower portion of the fixing member 171 may be formed in a shape corresponding to the shape of the dust bin body 2161.

Through this configuration, when the fixing member 171 rotates to surround the dust bin 2160 and the battery housing 2150, it is possible to prevent a space from being formed between the dust bin 2160 and the fixing member 171 and between the battery housing 2150 and the fixing member 171, and it is possible to prevent the dust within the dust bin 2160 from scattering to the outside of the cleaner station 10 when dust is sucked by the dust collection motor 120.

The fixing portion motor 172 may provide power for moving the fixing member 171. Specifically, the fixing member 171 may be moved by the fixing portion motor 172 from the inside of the side wall 1155 in a direction of pressing the dust bin 2160, so that the first cleaner 20 can be fixed to the cleaner station 10. Alternatively, the fixing member 171 may move from a position where the dust bin 2160 is pressed to the inside of the side wall 1155, so that the state in which the first cleaner 20 is fixed to the cleaner station 10 can be released.

The fixed sealer 173 may be disposed on the dust bin guide surface 1152 to seal the dust bin 2160 when the first cleaner 20 is coupled. Through this configuration, when the dust bin 2160 of the first cleaner 20 is coupled, the fixed sealer 173 can be pressed by the weight of the cleaner 20, and the dust bin 2160 and the dust bin guide surface 1152 can be sealed such that the flow of air does not leak.

The cleaner station 10 may further include the door unit 180.

Referring to FIG. 9, the door unit 180 is disposed from the coupling surface 1151 to the rear of the coupling surface 1151 and may include a door 181, a door arm 182, and a door motor 183.

The door 181 may be coupled to the coupling surface 1151 by a hinge 185, and may rotate about the hinge 185 to open and close the inside and outside of the housing 110.

More specifically, when the door arm 182 pulls the door 181 in a state where the door 181 closes the inside of the housing 110, the door 181 may moves rotationally toward the inside of the housing 110 of the cleaner station 10. Meanwhile, when the door arm 182 pushes the door 181, the door 181 may move rotationally toward the outside of the cleaner station 10.

The door motor 183 may provide power for rotating the door 181 to the door arm 182. Specifically, the door motor 183 may rotate the door arm 182 in the forward or reverse direction. Here, the forward direction may mean a direction in which the door arm 182 pulls the door 181 toward the inside of the housing 110. Also, the reverse direction may mean a direction in which the door arm 182 pushes the door 181 toward the outside of the housing 110.

The door arm 182 may connect the door 181 and the door motor 183 and may open and close the door 181 by using the power generated by the door motor 183.

For example, the door arm 182 may include a first door arm 182a and a second door arm 182b. One side end of the first door arm 182a may be coupled to the door motor 183. The first door arm 182a may rotate by the power of the door motor 183. The other side end of the first door arm 182a may be rotatably coupled to the second door arm 182b. The first door arm 182a may transmit the power transmitted from the door motor 183 to the second door arm 182b. One side end of the second door arm 182b may be coupled to the first door arm 182a. The other side end of the second door arm 182b may be coupled to the door 181. The second door arm 182b may push or pull the door 181.

The cleaner station 10 may further include the cover opening unit 190.

Referring to FIG. 10, the cover opening unit 190 is disposed within the housing 110 and below the coupling portion 115 to open the exhaust cover 2162 of the first cleaner 20. The cover opening unit 190 may include a push protrusion 191, a cover opening gear 192, and a cover opening motor (not shown).

The push protrusion 191 may be disposed at a position where the coupling lever 2163 can be pressed when the first cleaner 20 is coupled. The push protrusion 191 may perform a linear reciprocating motion in such a way as to press the coupling lever 2163. Specifically, the push protrusion 191 may be disposed on the dust bin guide surface 1152. A protrusion movement hole may be formed on the dust bin guide surface 1152, and the push protrusion 191 may pass through the protrusion movement hole and be exposed to the outside. The push protrusion 191 may be coupled to the cover opening gear 192 and may move together by the movement of the cover opening gear 192.

The cover opening motor may provide the cover opening gear 192 with power for moving the push protrusion 191.

The cover opening gear 192 may be coupled to the cover opening motor and may move the push protrusion 191 by using the power of the cover opening motor. More specifically, the cover opening gear 192 may include a first cover opening gear 192a and a second cover opening gear 192b. The first cover opening gear 192a receives rotation power from a shaft of the cover opening motor. The second cover opening gear 192b meshes with the first cover opening gear 192a and transmits the linear reciprocating motion to the push protrusion 191.

Here, the first cover opening gear 192a may be composed of a pinion gear, and the second cover opening gear 192b may be composed of a rack gear.

In other words, when the body 2100 of the first cleaner 20 is fixed to the coupling portion 115, the cover opening motor moves the push protrusion 191 through the cover opening gear 192, thereby separating the exhaust cover 2162 from the dust bin body 2161.

Hereinafter, a configuration of the cleaner station 10 as a communication hub will be described with reference to the block diagrams of the cleaner station 10, the first cleaner 20, and the second cleaner 30.

Figure 11:
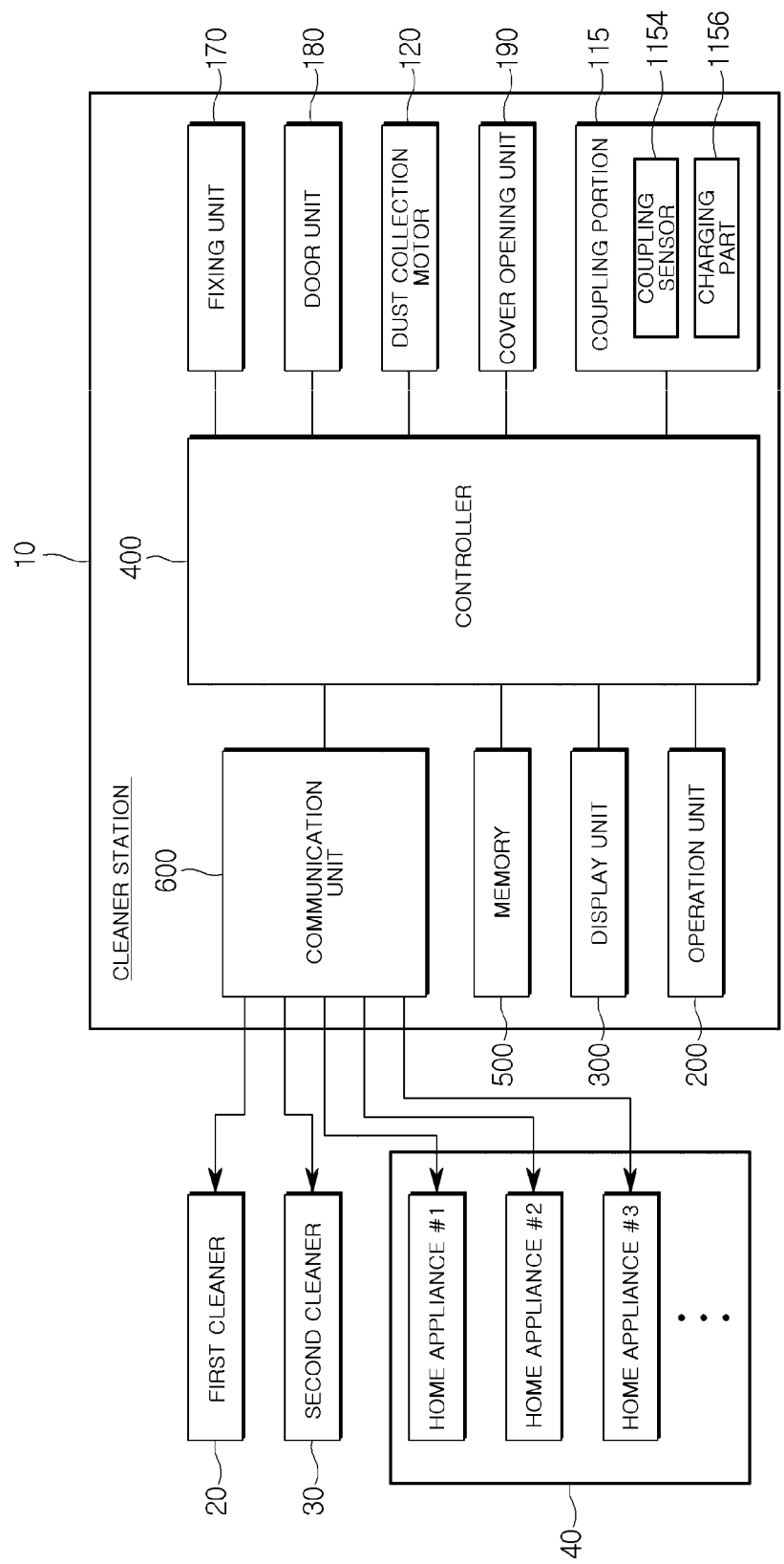
FIG. 11 is a block diagram of the cleaner station according to the embodiment of the present disclosure.

FIG. 11 is a block diagram of the cleaner station according to the embodiment of the present disclosure.

The cleaner station 10 according to the embodiment of the present disclosure may further include an operation unit 200, a display unit 300, a controller 400, a memory 500, and a communication unit 600. Here, the controller 400 may control the operations of the coupling portion 115, the dust collection motor 120, the fixing unit 170, the door unit 180, the cover opening unit 190, the operation unit 200, the display unit 300, the memory 500, and the communication unit 600.

The operation unit 200 may be composed of a conventional button, a conventional touch panel, or the like, and may be configured to receive a command for operating the cleaner station 10 by being touched or pressed by a predetermined force by the user. That is, when the operation unit 200 is pressed by the user, various operations related to the cleaner station 10 may be turned on or off.

For example, the operation unit 200 may include a power button configured to turn on or off the power supplied to the cleaner station 10 from the outside. Also, as an example, the operation unit 200 may include a drive button configured to forcibly start or turn off the drive of the dust collection motor 120 of the cleaner station 10.

Figure 12:
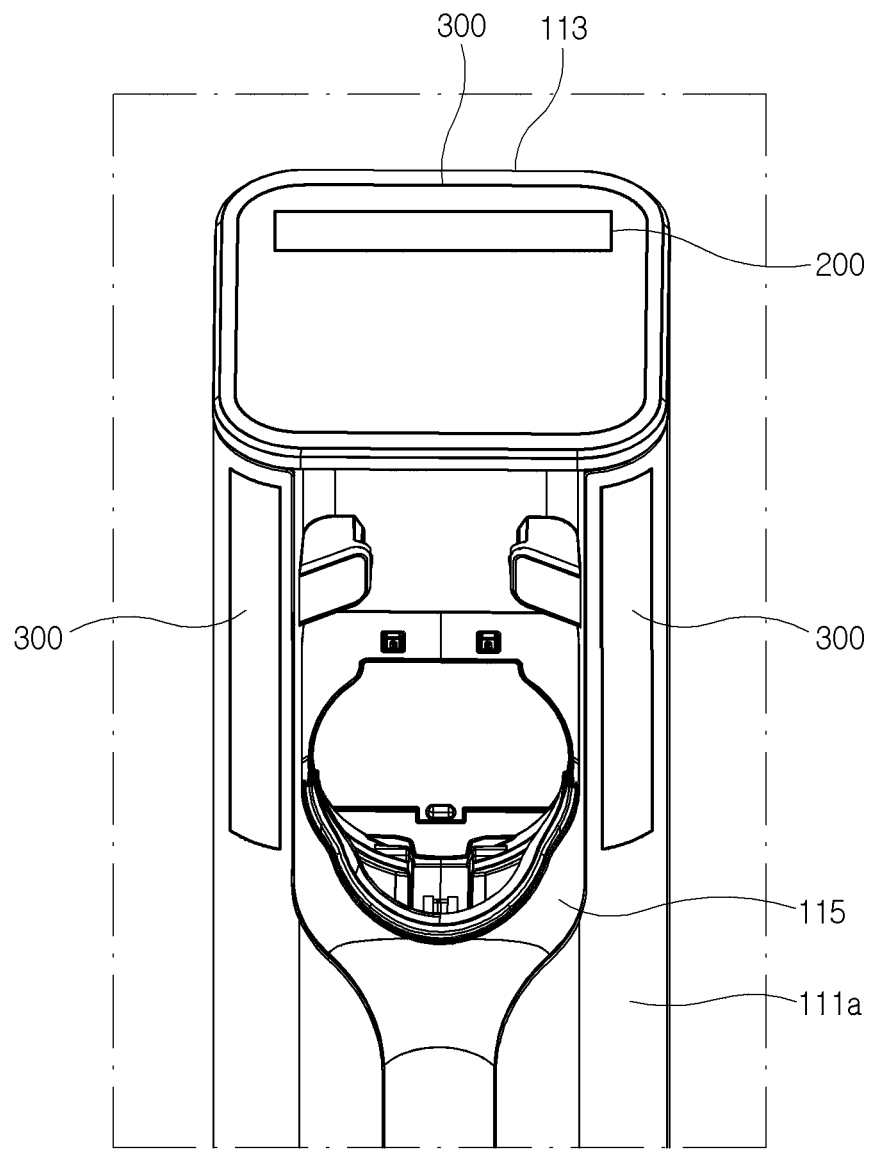
FIGS. 12 to 14 are view for describing a preferable arrangement structure of an operation unit and a display unit of the cleaner station according to the embodiment of the present disclosure.
Figure 13:
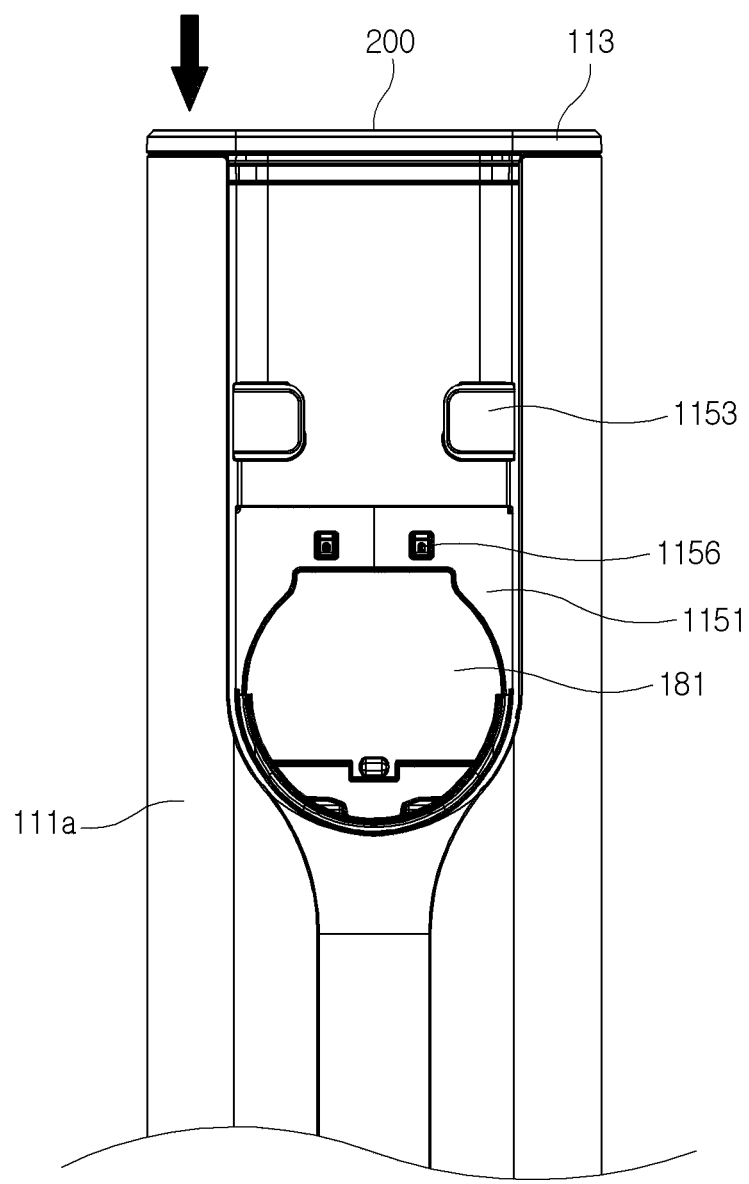
Figure 14:
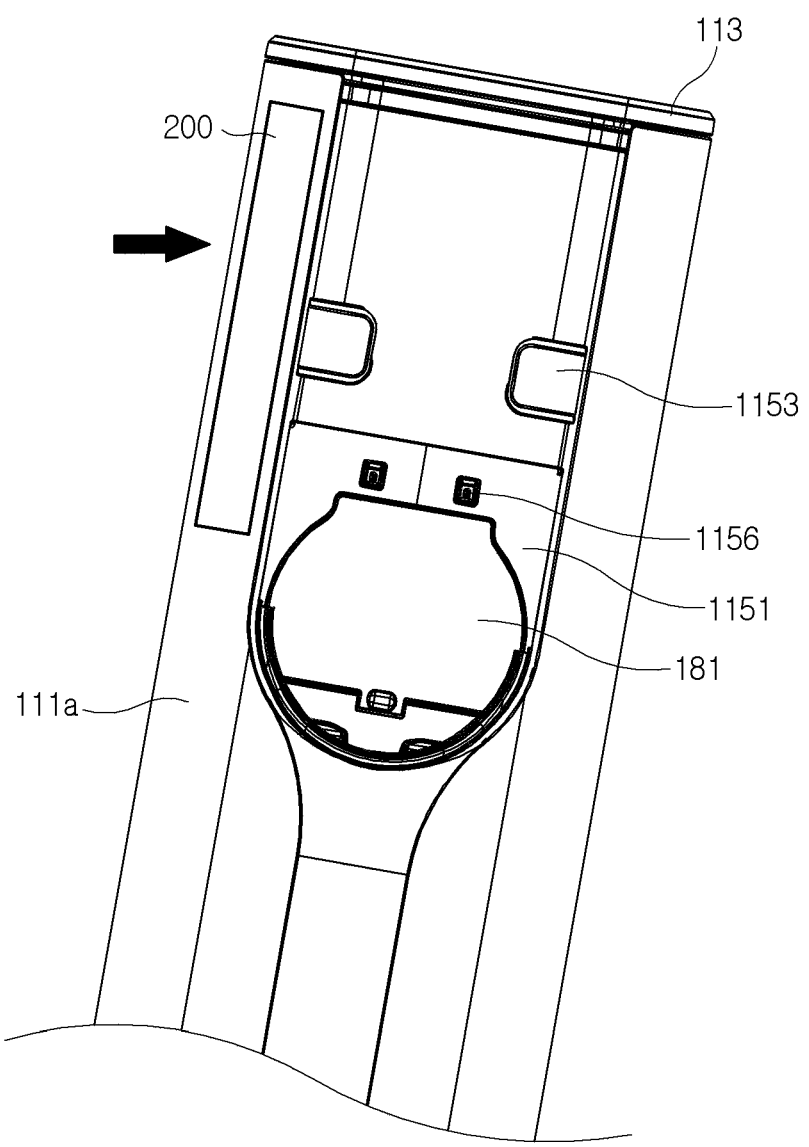

FIGS. 12 to 14 are view for describing a preferable arrangement structure of the operation unit and the display unit of the cleaner station according to the embodiment of the present disclosure.

Referring to FIGS. 12 and 13, the operation unit 200 may be disposed on the top cover 113. From another point of view, the operation unit 200 may be disposed on the major axis direction top surface of the housing 110. From yet another point of view, the operation unit 200 may be disposed such that the direction of pressure applied to the operation unit 200 by the user (a direction of an arrow in FIG. 13) is parallel to the major axis direction of the housing.

With this configuration, since the user does not have to lower his or her posture when operating such as pressing or touching the operation unit 200 disposed on the top surface of the housing 110, it can be convenient to operate the cleaner station 10. Also, when the operation unit 200 is disposed on the top cover 113, the user is able to operate the operation unit 200, so that visibility is secured.

Also, with this configuration, when the user applies pressure, such as presses or touches the operation unit 200, the cleaner station 10 can be supported with structural stability without falling over.

In order to describe the structural stability in detail, a case where the operation unit 200 is disposed on the outer wall surface of the housing 110 is taken as an example. For example, as shown in FIG. 14, in a case where the operation unit 200 is disposed on the side surface of the coupling portion 115 of the first outer wall surface 111a, when the user touches or presses the operation unit 200 in order to operate the cleaner station 10, pressure is applied in a direction perpendicular to the major axis direction of the housing 110 (a direction of an arrow in FIG. 14). When the operation unit 200 is disposed on a relatively upper portion of the first outer wall surface 111a for convenience of operation, the center of gravity of the housing 110 is disposed lower than the operation unit 200. Here, when the user applies pressure to the operation unit 200, a moment force is applied to the housing 110, and the structural stability of the housing 110 is lost by the moment force, so that there occurs a risk that the housing 110 falls sideways.

In contrast to this, as in the embodiment of the present disclosure, the operation unit 200 is disposed on the top surface of the housing 110 or the top cover 113 and the direction of the pressure applied by the user is parallel to the major axis direction of the housing 110. In this case, even if a moment force is applied, the housing 110 is supported on the ground in the direction in which the moment force is applied. Therefore, the risk described above can be prevented and structural stability cannot be lost. (see FIG. 13)

The display unit 300 may include at least one of a display means capable of outputting characters and/or figures, and a speaker capable of outputting voice signals and sounds. The user can easily identify, through the information output through the display unit 300, operations currently in progress, the charge states of the first cleaner 20 and/or the second cleaner 30, how much a dust bag is filled, drawing information of a room which is being cleaned, and the like.

Here, the display means may be composed of any one of a light emitting diode (LED), a liquid crystal display (LCD), a plasma display panel, and an organic light emitting diode (OLED).

Referring to FIG. 12, the display unit 300 may be disposed on the top cover 113. Alternatively, the display unit 300 may be disposed on one side of the housing 110 where the coupling portion 115 is provided. The one side of the housing 110 where the coupling portion 115 is provided may be the first outer wall surface 111a, and the display unit 300 may be disposed on an upper portion of the first outer wall surface 111a. Here, the display units 300 may be disposed on both sides with the coupling portion 115 interposed therebetween, so that various types of information on the cleaner 20 may be displayed in a distributed manner.

More specifically, for example, information that needs to be displayed over a large area, such as drawing information of a room which is being cleaned may be output on the display unit 300 disposed on the top cover 113.

Through this configuration, the user is able to check information from a position from where the display unit 300 disposed on the top cover 113 is looked down, and also, the information can be displayed on a wider area, so that visibility is secured.

Alternatively, for example, information that can be identified even when displayed on a small area, such as the charge states of the first cleaner 20 and/or the second cleaner 30, may be disposed on both sides of the coupling portion 115 on the first outer wall surface 111a in a distributed manner.

Through the configuration of the display unit 300 disposed on both sides (which may be referred to as the left and right sides) of the coupling portion 115, the user may take out the first cleaner 20 and quickly check the charge state of the first cleaner 20, etc., before performing a cleaning operation. Also, since the left and right sides of the coupling portion 115 are positioned relatively higher than the housing 110 on the basis of the user's eye level, visibility is secured.

Meanwhile, position information of the first cleaner 20 transmitted through the communication unit 600 by the first cleaner 20 during the cleaning operation may be displayed on the display unit 300.

The first cleaner 20 may be a stick vacuum cleaner which is configured such that the user manually cleans a room himself/herself by gripping the handle 2140. A path through which the first cleaner 20 passes while cleaning the room may be transmitted to the cleaner station 10 in real time. To this end, the first cleaner 20 may include a sensing unit 23 including a sensor for detecting the position of the first cleaner 20.

Also, position information of the second cleaner 30 transmitted through the communication unit 600 by the second cleaner 30 during the cleaning operation may be displayed on the display unit 300.

The second cleaner 30 may be a robot vacuum cleaner that cleans the room while traveling autonomously. A path through which the second cleaner 30 passes while cleaning the room may be transmitted to the cleaner station 10 in real time. To this end, the second cleaner 30 may include a sensing unit 33 including a sensor for detecting the position of the second cleaner 30.

The controller 400 may be composed of a printed circuit board and devices mounted on the printed circuit board.

When the cleaner 10 is coupled to the coupling portion 115, the coupling sensor 1154 may detect the coupling and transmit a signal to the controller 400. Here, the controller 400 may receive the signal of the coupling sensor 1154 and determine that the first cleaner 20 is coupled.

Also, when not only the signal from the coupling sensor 1154 is received but also the charging part 1156 and the battery of the first cleaner 20 are coupled to supply power to the battery of the first cleaner 20, the controller 400 may determine that the first cleaner 20 is coupled to the coupling portion 115.

If determining that the first cleaner 20 is coupled to the coupling portion 115, the controller 400 may operate the fixing unit 170 to fix the first cleaner 20 to the coupling portion 115. More specifically, when the controller 400 transmits a signal for driving the fixing portion motor 172 to the fixing portion motor 172, the fixing portion motor 172 is driven and the fixing member 171 moves from the inside of the side wall 1155 toward the dust bin 2160, so that the dust bin body 2161 and the battery housing 2150 can be fixed to the coupling portion 115.

After the first cleaner 20 is fixed to the coupling portion 115, the controller 400 may open the door 181 of the cleaner station 10 by operating the door unit 180. More specifically, when the controller 400 transmits a signal for driving the door motor 183 to the door motor 183, the door motor 183 is driven and the door arm 182 moves in a direction of opening the door 181. Then, the door 181 can be opened.

The controller 400 may open the exhaust cover 2162 of the cleaner 20 by operating the cover opening unit 190 after the door 181 is opened. More specifically, when the controller 400 transmits a signal for driving the cover opening motor to the cover opening motor, the cover opening motor is driven, and the cover opening gear 192 connected to the cover opening motor may move the push protrusion 191 in a straight line in a direction of pressing the coupling lever 2163 of the dust bin 2160. When the push protrusion 191 presses the coupling lever 2163 of the exhaust cover 2162, the exhaust cover 2162 is opened so that the inside of the dust bin 2160 and the first flow path 141 may communicate with each other.

After both the door 181 and the exhaust cover 2162 are opened and the inside of the dust bin 2160 communicates with the first flow path 141, the controller 400 drives the dust collection motor 120 to generate a suction force that sucks the dust within the dust bin 2160. More specifically, when the controller 400 transmits a signal for driving the dust collection motor 120 to the dust collection motor 120, the dust collection motor 120 is driven to generate a suction force which is directed from the top to the bottom of the first flow path 141. When the suction force is generated in the first flow path 141, the dust present within the dust bin 2160 can move through the first flow path 141 and is collected to the dust collector 130 coupled to the end of the first flow path 141.

The controller 400 may operate each component by generating a control signal corresponding to a command input by the user through the operation unit 200. For example, when the user touches or presses a power button included in the operation unit 200 by applying pressure, the controller 400 may control such that power is supplied to the cleaner station 10.

The controller 400 may operate the display unit 300 to display various types of information on the cleaner 20 on the display unit 300. For example, the display unit may display an empty state of the dust bin of the cleaners 20 and 30, the charge state, the charge states of the cleaners 20 and 30, and drawing information of a room updated by the cleaners 20 and 30 performing the cleaning operation, etc.

Meanwhile, the controller 400 may be connected to an external device by wireless communication through the communication unit 600 to be described later. In this case, the controller 400 may transmit a variety of information to the connected external device. Also, the controller 400 may receive the information from the connected external device through the communication unit 600 and store the information in the memory 500 to be described later.

Here, the external device may be one or more home appliances 40, the cleaners 20 and 30, or an external server disposed in the room where the cleaner station 10 is installed. The transmitted or received information may be position information of the home appliances or the cleaners 20 and 30, and drawing information including a structure of the room in which the cleaner station 10 is installed.

The controller 400 may receive the drawing information including a structure of the room in which the cleaner station 10 is installed as an image from an external server. The controller 400 may output the drawing information through the display unit 300 and store the drawing information in the memory 500.

Alternatively, the drawing information including the structure of the room may be stored in advance in the memory 500 of the cleaner station 10.

Figure 15:
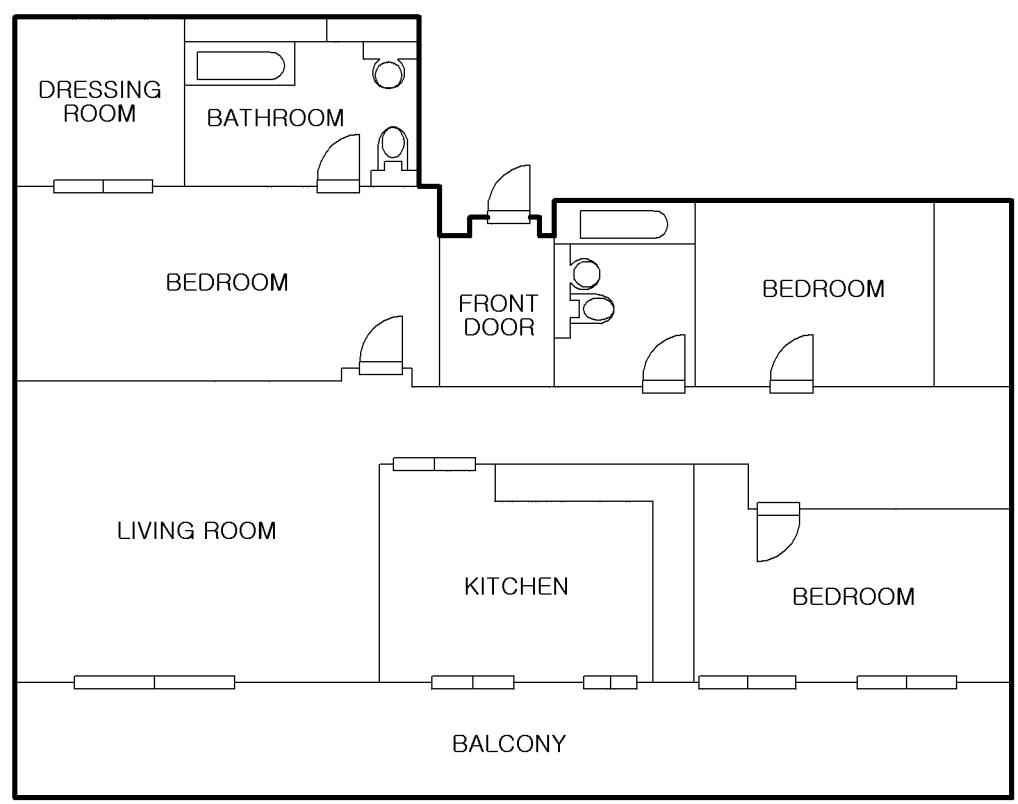
FIGS. 15 to 19 are illustrative views for describing a process of updating drawing information displayed on the display unit of the cleaner station according to the embodiment of the present disclosure.

An example of the drawing information which includes the structure of the room and is displayed as an image is disclosed in FIG. 15. As shown in FIG. 15, the drawing information may include information on the shape and area of each region in the room to be cleaned.

The controller 400 may update the drawing information by receiving the position information of each of the home appliances 40. The controller 400 may output the updated drawing information to the display unit 300. The controller 400 may store the updated drawing information in the memory 500.

Figure 16:
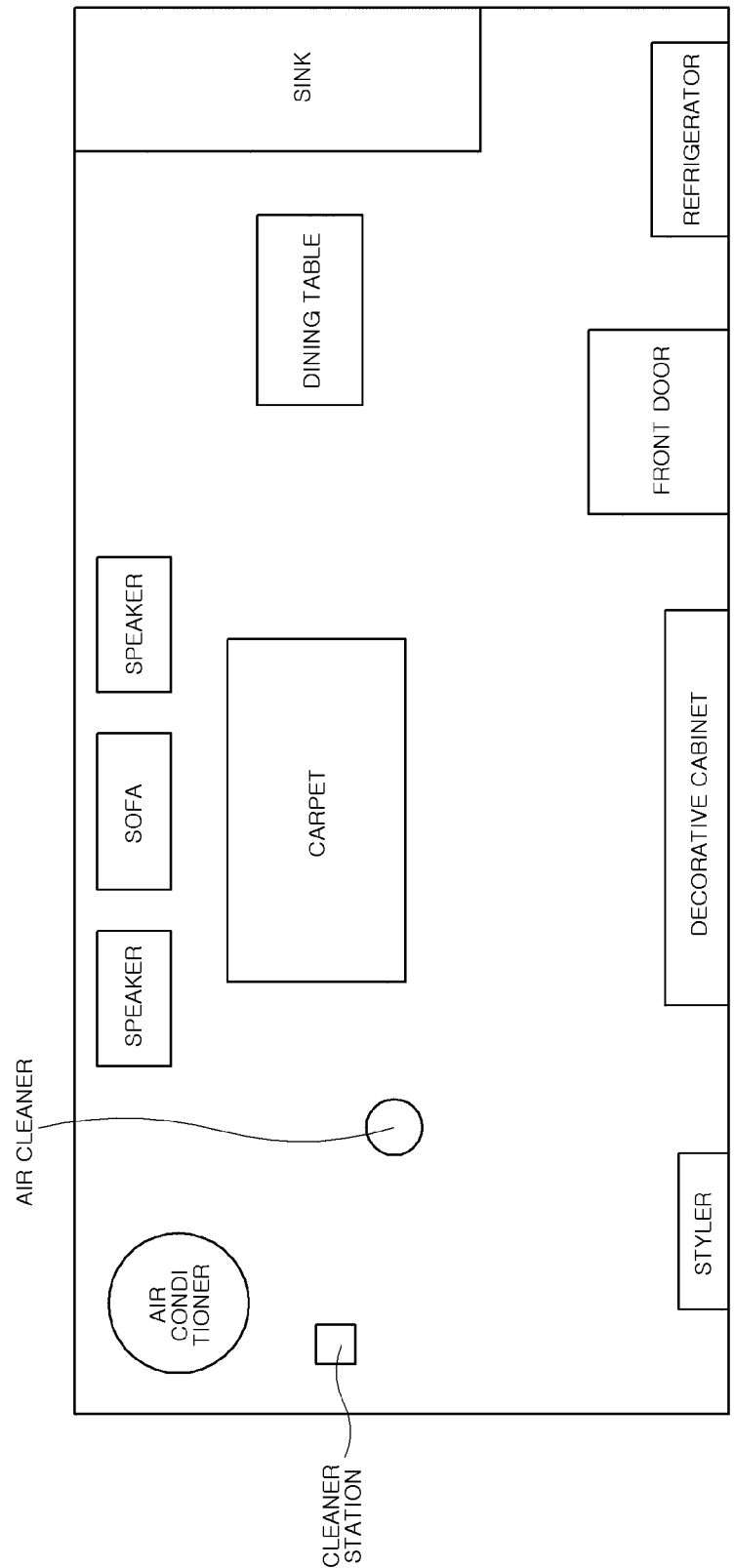

An example of arrangement of the home appliances 40 disposed in a room to be cleaned is disclosed in FIG. 16.

Referring to FIG. 16, the home appliances 40 may include, for example, a refrigerator, an air purifier, an air conditioner, a styler, etc. The home appliances 40 may also include the cleaner station 10.

The home appliances 40 may include a communication module capable of wirelessly communicating with the cleaner station 10. When each of the home appliances 40 transmits its position information to the communication unit 600 of the cleaner station 10, the controller 400 may update by reflecting the received position information of each of the home appliances 40 to the drawing information.

For example, the position information of each of the home appliances 40 may be identified by using infrared communication between the home appliances 40. Alternatively, as another example, the position information of each of the home appliances 40 may be identified as relative position information through the transmission and reception of an ultrasonic signal between the home appliances 40. Alternatively, as another example, an installation position at a point of time when the home appliances 40 are installed may be converted into data as position information and may be stored in advance in each of the home appliances 40. Here, it should be noted that not only the method of the above-described example but also any method can be applied as long as the method allows the home appliance 40 to detect its own position information or position information of others. Also, it should be noted that the method for detecting the position information is not limited to any one method.

Figure 17:
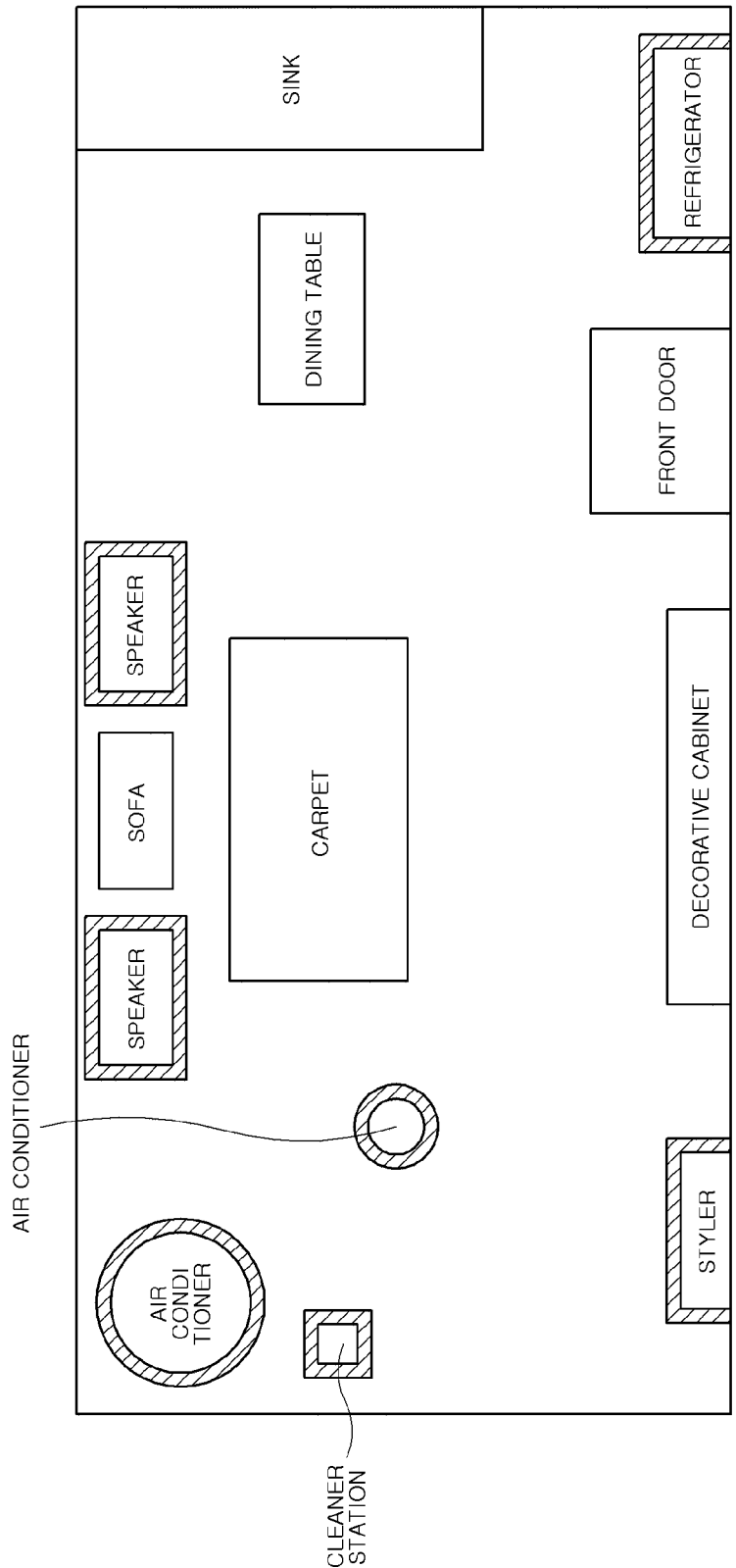

An example of the drawing information updated by reflecting the position information of the home appliances 40 is disclosed in FIG. 17.

Referring to FIG. 17, the controller 400 may further receive information on the size of the bottom surface of each of the home appliances 40 together with the position information of each of the home appliances 40. For example, the controller 400 may update the drawing information by a method for reflecting, on the basis of the position information of each of the home appliances 40, a predetermined area larger than the size of the bottom surface of each home appliance as an area where the home appliances 40 exist (a hatched area in FIG. 17) to the drawing information.

Here, an operation of updating by reflecting the position information of the home appliances 40 to the drawing information may be defined as primary mapping.

Meanwhile, when the first cleaner 20 is performing the cleaning operation, the communication unit 600 may receive position information including a moving path of the first cleaner 20 from the first cleaner 20 in real time. The controller 400 may update by reflecting the position information of the first cleaner 20 to the drawing information. The controller 400 may output the updated drawing information to the display unit 300. The controller 400 may store the updated drawing information in the memory 500.

Figure 18:
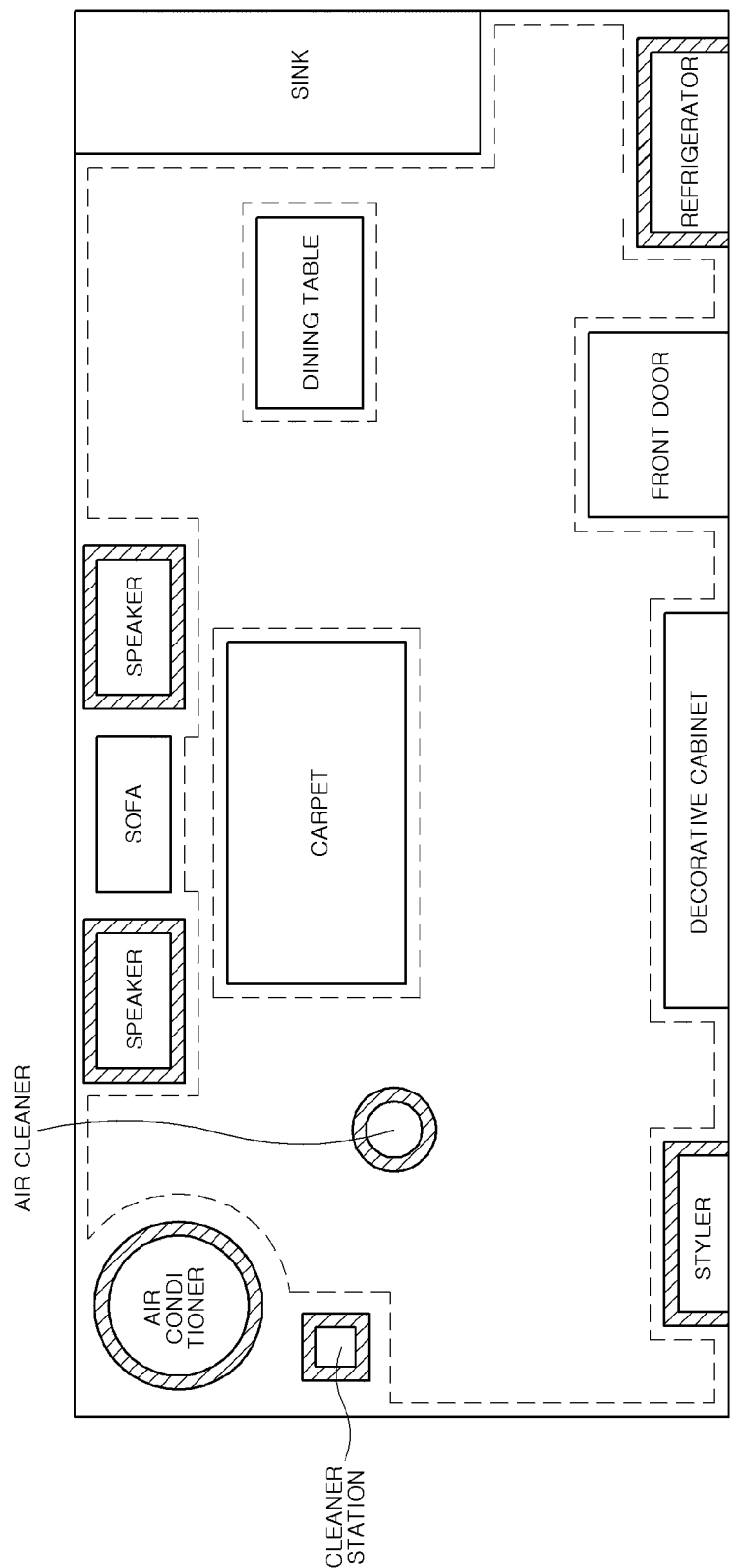

An example of the drawing information updated by reflecting the position information of the first cleaner 20 received during the cleaning operation of the first cleaner 20 is disclosed in FIG. 18.

Referring to FIG. 18, first, the user may clean while moving the first cleaner 20 along the outside of the wall surface and the outsides of the home appliances 40 and furniture positioned near the wall surface. A dotted line in FIG. 18 represents such a moving path of the first cleaner 20.

Here, an updating operation in which the controller 400 receives in real time the position information of the first cleaner 20 including the moving path of the first cleaner 20 and reflects the position information to the drawing information may be defined as secondary mapping.

Obstacles recognized during the secondary mapping by the first cleaner 20 may include not only the home appliances 40 but furniture without a communication function, such as a carpet, a decorative cabinet, a sofa, a dining table, etc. Accordingly, the position of the obstacle can be more accurately reflected to the drawing information updated through the secondary mapping in addition to the primary mapping.

Also, the user can directly check, through the display unit 300, the path along which the first cleaner 20 moves while cleaning, and can visually and easily identify information on areas that have not been properly cleaned.

Meanwhile, the controller 400 may transmit the drawing information including the updated position information of the first cleaner 20 to the second cleaner 30 through the communication unit 600.

With this configuration, before starting the cleaning operation, the second cleaner 30 can receive in advance the drawing information in which the area mapped by the first cleaner 20 is reflected. By using this, the second cleaner 30 can accurately determine the position of the obstacle. During the cleaning operation, the second cleaner 30 can travel while avoiding the obstacle.

Also, since the information on the position of the obstacle is received in advance, there is no need to detect the position of the obstacle while cleaning, thereby reducing the cleaning time.

Also, in the process of returning to the charging base after completion of the cleaning operation, the second cleaner 30 can move through an optimal return path on the basis of the position of the obstacle included in the received drawing information, and it is possible to prevent that the second cleaner 30 cannot return due to being caught by the obstacle while returning to the charging base and is discharged.

Meanwhile, when the second cleaner 30 is performing the cleaning operation, the communication unit 600 may receive position information including a moving path of the second cleaner 30 from the second cleaner 30 in real time. The controller 400 may update by reflecting the position information received from the second cleaner 30 to the drawing information. The controller 400 may output the updated drawing information to the display unit 300. The controller 400 may store the updated drawing information in the memory 500.

Figure 19:
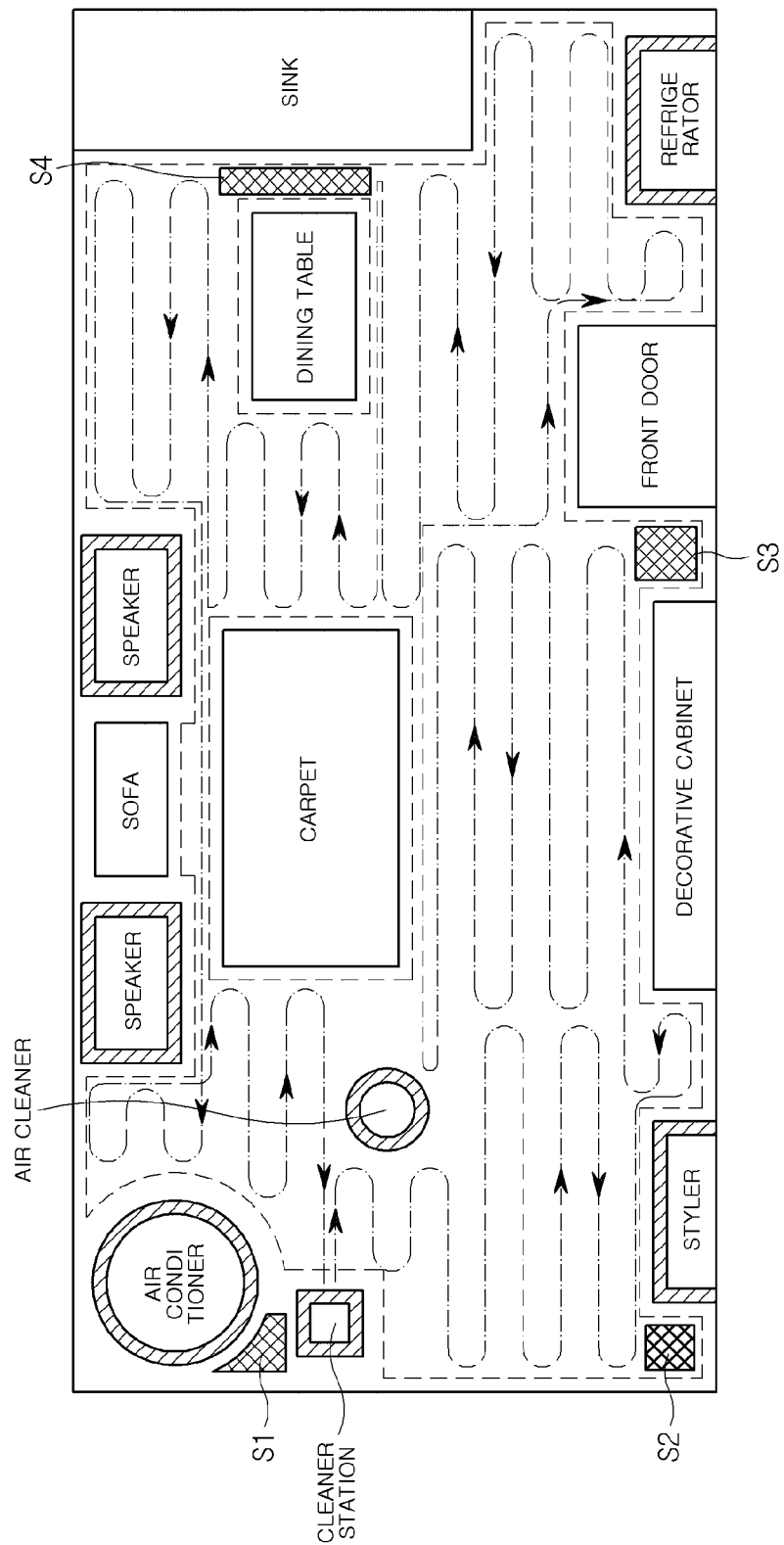

An example of the drawing information updated by reflecting the position information of the second cleaner 30 received during the cleaning operation of the second cleaner 30 is disclosed in FIG. 19.

Referring to FIG. 19, the second cleaner 30 may receive the drawing information updated by the secondary mapping and may perform a cleaning operation while driving autonomously avoiding the position of an obstacle. A dash-single dotted line in FIG. 19 represents such a moving path of the second cleaner 30.

Here, an updating operation in which the controller 400 receives in real time the position information including the moving path that the second cleaner 30 travels while performing the cleaning operation and reflects the position information to the drawing information may be defined as tertiary mapping.

Accordingly, through the display unit 300 of the cleaner station 10, the user may be provided with information on the uncleaned areas S1, S2, S3, and S4 after the tertiary mapping by the second cleaner 30. In other words, the user can directly check, through the display unit 300, the path that the second cleaner 30 travels while cleaning, and can visually and easily identify information on the uncleaned areas S1, S2, S3, and S4 that have not been properly cleaned.

When the second cleaner 30 performs the cleaning while autonomously traveling, there may be an area where the cleaning of a corner is not properly performed due to the volume of the second cleaner 30 itself. The cleaner station 10 according to the embodiment of the present disclosure is configured to display these uncleaned areas S1, S2, S3, and S4 on the display unit 300 so that it is possible to provide convenience of guiding the user to additionally clean only the uncleaned areas manually by using the first cleaner 20.

As such, the cleaner station 10 according to the embodiment of the present disclosure may receive the position information of the home appliances 40 and the position information including the moving paths of the first cleaner 20 and the second cleaner 30 each while functioning as a communication hub in the room in which the cleaner station 10 is installed. Also, the cleaner station 10 outputs the thus received information through the display unit 300 so that the user can be provided with visually processed drawing information, thereby enhancing the convenience of the cleaning operation.

The memory 500 may include various pieces of information for the operation of the cleaner station 10. The memory 500 may include application programs for the operation of the cleaner station 10 and various types of information related thereto. Also, each piece of information transmitted from the external device may be stored in the memory 500. The memory 500 may include setting information on various settings selected or input by the user (e.g., the brightness of the display unit, etc.).

The drawing information of the room received from an external server through the communication unit 600 may be stored in advance in the memory 500. The form of the drawing information stored in the memory 500 may be in the form of an image as shown in FIGS. 15 to 19.

The communication unit 600 may include at least one module enabling wireless communication between the cleaner station 10 and an external device. As described above, the external device may be one or more home appliances, the cleaners 20 and 30, or an external server.

For example, the at least one module may include at least one of an infrared (IR) module for infrared communication, an ultrasonic module for ultrasonic communication, or a short-range communication module such as a WiFi module or a Bluetooth module. Alternatively, the at least one module may include a wireless Internet module and may transmit and receive data to and from predetermined devices through various wireless technologies such as Wireless LAN (WLAN) and Wireless-Fidelity (Wi-Fi), or the like.

Figure 20:
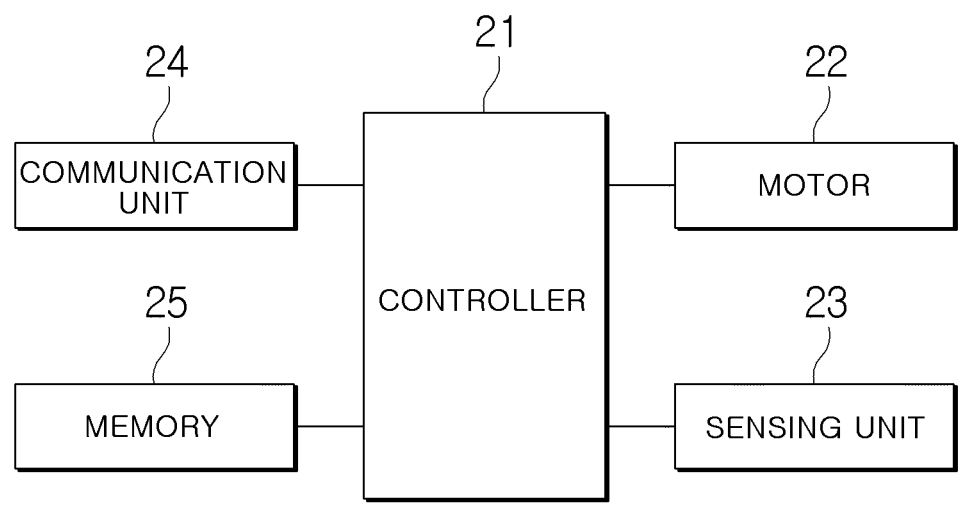
FIG. 20 is a block diagram of the first cleaner.

FIG. 20 is a block diagram of the first cleaner 20 constituting the cleaner system 1 according to the embodiment of the present disclosure.

The first cleaner 20 may include a controller 21, a motor 22, the sensing unit 23, a communication unit 24 and a memory 25.

The controller 21 may be connected to the cleaner station 10 and/or the second cleaner 30 by wireless communication through the communication unit 24. The controller 21 may detect the position of the first cleaner 20 through the sensing unit 23 to be described later. Also, the controller 21 may store a moving path that the first cleaner 20 travels while performing the cleaning operation in the memory 25 to be described later, and may transmit the position information of the first cleaner 20 including the moving path and the detected position to the cleaner station 10 and/or the second cleaner 30 connected by wireless communication. Also, the controller 21 may control the motor 22 to provide a suction force for sucking foreign substances to the cleaner head 2300 of the first cleaner 20.

The motor 22 may provide the suction force for sucking foreign substances to the cleaner head 2300 of the first cleaner 20. More specifically, the motor 22 may be controlled to provide the suction force set by the user to the cleaner head 2300 under the control of the controller 21. When the motor 22 is operated, the suction force for sucking foreign substances is generated in the cleaner head 2300, and the foreign substances may be sucked into the cleaner head 2300, may pass through the extension tube 2200, and may be stored in the dust bin 2160.

The sensor unit 23 may include a position detection sensor for detecting the moving path of the first cleaner 20 during the cleaning operation and a current position of the first cleaner 20. For example, the sensor unit 23 may be disposed on the cleaner head 2300 to move together with the cleaner head 2300 and may detect an accurate position of the cleaner head 2300. The sensor unit 23 may include, for example, a Hall sensor, a GPS sensor, and other various sensors that detect a change in position.

The communication unit 24 may include at least one module which enables the first cleaner 20 to wirelessly communicate with the cleaner station 10, the second cleaner 30, an external server, etc.

For example, the at least one module may include at least one of an infrared (IR) module for infrared communication, an ultrasonic module for ultrasonic communication, or a short-range communication module such as a WiFi module or a Bluetooth module. Alternatively, the at least one module may include a wireless Internet module and may transmit and receive data to and from predetermined devices through various wireless technologies such as Wireless LAN (WLAN) and Wireless-Fidelity (Wi-Fi), or the like.

The memory 25 may include various pieces of information for the operation of the first cleaner 20. The memory 25 may include application programs for the operation of the first cleaner 20 and various types of information related thereto.

Figure 21:
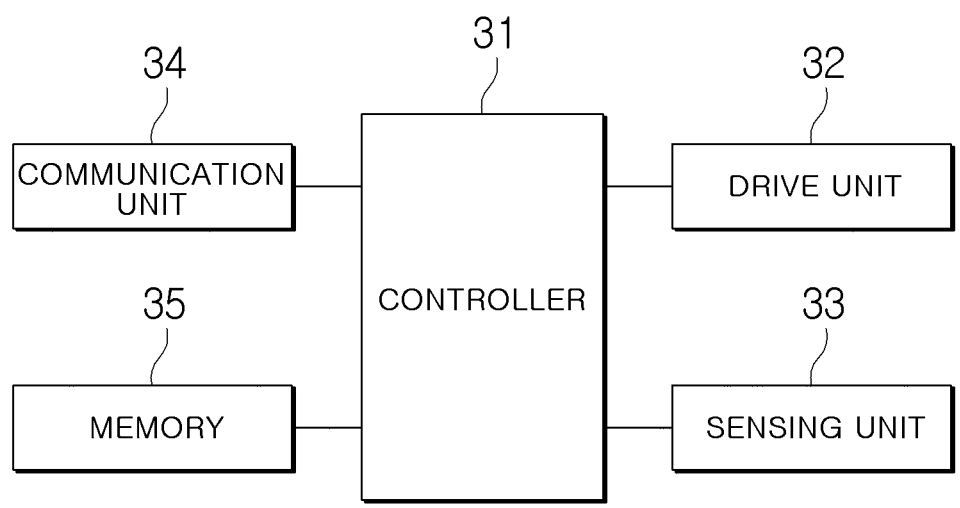
FIG. 21 is a block diagram of a second cleaner.

FIG. 21 is a block diagram of the second cleaner 30 constituting the cleaner system 1 according to the embodiment of the present disclosure.

The second cleaner 30 may include a controller 31, the drive unit 32, the sensor unit 33, a communication unit 34 and a memory 35.

The controller 31 may be connected to the cleaner station 10 and/or the first cleaner by wireless communication through the communication unit 34. The controller 31 may detect the position of the second cleaner 30 through the sensing unit 33 to be described later. Also, the controller 31 may store a moving path that the second cleaner 30 travels while performing the cleaning operation in the memory 35 to be described later, and may transmit the position information including the moving path and the detected position to the cleaner station 10 and/or the first cleaner 20 connected by wireless communication. Also, the controller 31 may control the drive unit 32 to provide a driving force to the second cleaner 30.

Also, when the communication unit 34 receives the drawing information updated through the secondary mapping by the first cleaner 20 from the cleaner station 10, the controller 31 may store the received drawing information in the memory 35 and may determine the position of an obstacle on the basis of the received drawing information, thereby controlling to perform avoidance driving during autonomous driving.

Also, the controller 31 may determine the position of the obstacle on the basis of the received drawing information and may control the second cleaner 30 to avoid the obstacle when returning to the charging base after completion of the cleaning.

The drive unit 32 is a component for moving the second cleaner 30. For example, the drive unit 32 of the second cleaner 30 may include a pair of wheels and a motor coupled to the pair of wheels. As another example, the drive unit 32 of the second cleaner 30 may include a pair of mop and a motor coupled to the pair of mop.

The sensor unit 33 may include an optical flow sensor (OFS), a camera, etc., in order to detect the moving path of the second cleaner 30 during the cleaning operation and a current position of the second cleaner 30. Also, the sensor unit 33 may further include obstacle detection sensors for detecting the position of an obstacle during autonomous driving in an area to be cleaned. For example, the obstacle detection sensor may include a cliff sensor for detecting a cliff, a distance sensor for detecting a wall surface, a collision detection sensor, and the like.

The communication unit 34 may include at least one module which enables the second cleaner 30 to wirelessly communicate with the cleaner station 10, the first cleaner 20, and an external server, etc.

For example, the at least one module may include at least one of an infrared (IR) module for infrared communication, an ultrasonic module for ultrasonic communication, or a short-range communication module such as a WiFi module or a Bluetooth module. Alternatively, the at least one module may include a wireless Internet module and may transmit and receive data to and from predetermined devices through various wireless technologies such as Wireless LAN (WLAN) and Wireless-Fidelity (Wi-Fi), or the like.

The memory 35 may include application programs for autonomous driving of the second cleaner 30 and various types of information related thereto. Also, the memory 35 may store each piece of information sensed by the sensor unit 33 and may store setting information on various settings selected or input by the user (e.g., cleaning reservation time, cleaning mode, etc.).

Figure 22:
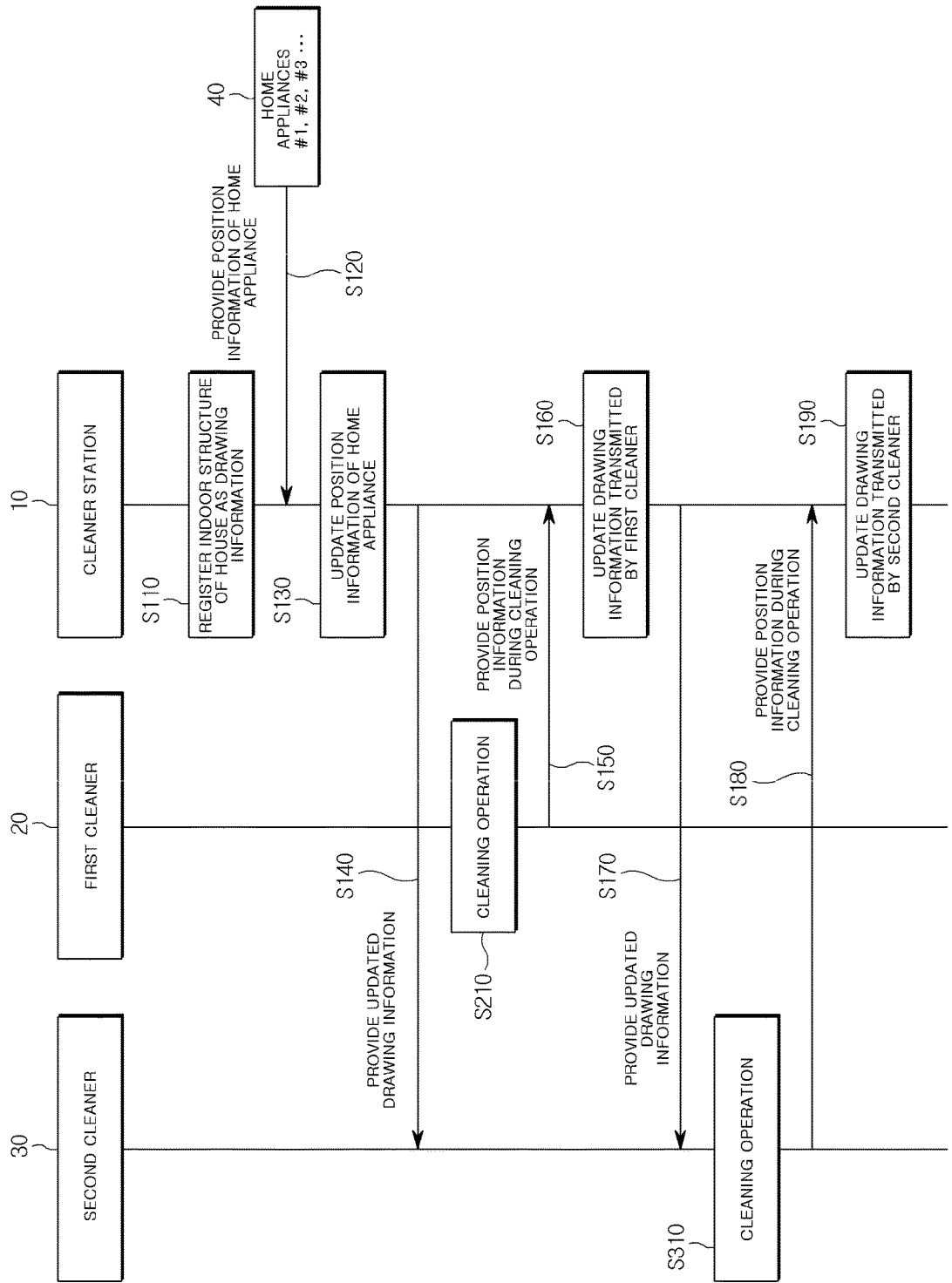
FIG. 22 is a flowchart showing a process in which the cleaner system according to the embodiment of the present disclosure communicates with the first cleaner and the second cleaner and transmits and receives information.

FIG. 22 is a flowchart showing a process in which the cleaner system 10 according to the embodiment of the present disclosure communicates with the first cleaner 20 and the second cleaner 30 and transmits and receives information.

First, the controller 400 of the cleaner station 10 may register an indoor structure of a house where the cleaner station 10 is installed as drawing information (S110). Here, the indoor structure of the house may be received from an external server by wireless communication through the communication unit 600. Such an indoor structure may be stored as big data in advance in the external server. Alternatively, the indoor structure of the house may be stored in advance in the memory 500 of the cleaner station 10.

Next, position information of each of the home appliances 40 may be received from the home appliances 40 present in the room where the cleaner station 10 is installed (S120). Here, the position information of each of the home appliances 40 may be received through the communication unit 600 connected to each of the home appliances 40 by wireless communication.

Then, the controller 400 of the cleaner station 10 may update the received position information of each of the home appliances 40 to the registered drawing information (S130). Here, as described above, the operation in which the controller 400 combines the position information of each of the home appliances 40 with the information on the size of the bottom surface of each of the home appliances 40, and reflects the result of the combination to the drawing information can be defined as the primary mapping.

The controller 400 of the cleaner station 10 may transmit the drawing information updated by the primary mapping to the second cleaner 30 by wireless communication through the communication unit 600 (S140). Also, the controller 400 may output the drawing information updated by the primary mapping to the display unit 300.

Meanwhile, the user may move along the outer wall of the room and the outsides of the home appliances 40 and furniture while manually performing the cleaning operation by using the first cleaner 20. Here, the controller 400 of the cleaner station 10 may receive the position information including the moving path of the first cleaner 20 from the first cleaner in real time through the communication unit 600 (S150).

The controller 400 of the cleaner station 10 may perform the secondary mapping to reflect and update the position information to the drawing information (S160). The controller 400 may transmit the drawing information updated by the secondary mapping to the second cleaner 30 by wireless communication through the communication unit 600 (S170). Also, the controller 400 may output the drawing information updated by the primary mapping to the display unit 300.

Meanwhile, the second cleaner 30 may perform a cleaning operation while driving autonomously. The second cleaner 30 can recognize an obstacle, and perform the cleaning operation while performing avoidance driving on the basis of the drawing information updated by the first mapping received from the cleaner station 10 or the drawing information updated even by the secondary mapping.

When the second cleaner 30 performs a cleaning operation by autonomous driving, the controller 400 of the cleaner station 10 may receive in real time the position information including the moving path of the second cleaner 30 transmitted by the second cleaner 30 through the communication unit 500 (S180).

The controller 400 of the cleaner station 10 may perform the tertiary mapping to reflect and update the position information to the drawing information (S190). The controller 400 may output the drawing information updated by the tertiary mapping to the display unit 300.

As described above, according to the embodiment of the present disclosure, through the sharing of the drawing information by using wireless communication between the cleaner station, the stick vacuum cleaner, and the robot vacuum cleaner, the robot vacuum cleaner can accurately receive obstacle information in a room which is cleaned by the robot vacuum cleaner.

Also, by using the received obstacle information, the cleaning efficiency of the robot vacuum cleaner can be increased and collision with an obstacle can be prevented when the robot vacuum cleaner returns to the charging base.

Also, since the cleaner station is provided with the display unit and the drawing information is output on the display unit by using the wireless communication, a user is able to visually and easily identify information on an uncleaned area that has not been cleaned by the robot vacuum cleaner.

Also, the display unit of the cleaner station is disposed on an upper portion of the cleaner station, convenience that allows visibility of the display unit to be increased can be provided.

Also, an operation unit of the cleaner station is disposed such that a direction of pressure applied by the user to the operation unit and a direction of a major axis of the cleaner station are parallel. Accordingly, user convenience can be improved and structural stability of the cleaner station can be ensured.

Also, since a top cover of the cleaner station is provided to be pivotable around a hinge, it is possible to provide convenience when attaching and detaching the stick vacuum cleaner to the cleaner station.

Although the foregoing has described a specific embodiment of the present disclosure, it can be understood by those skilled in the art that the present disclosure is not limited to the illustrated embodiment and can be variously changed and modified to other specific embodiments without departing from the spirit and scope of the present disclosure. Therefore, the scope of the present disclosure should be determined not by the described embodiments but by the spirit as defined by the appended claims.

The invention claimed is:

1. A cleaner system comprising:
   a cleaner; and
   a cleaner station configured to collect dust discharged from a dust bin of the cleaner, the cleaner station comprising a housing that is configured to couple to the cleaner and defines an inner space configured to collect the dust,
   wherein the cleaner comprises (i) a first cleaner configured to perform a first cleaning operation by a user and (ii) a second cleaner configured to autonomously perform a second cleaning operation, and
   wherein the cleaner station further comprises a display disposed at the housing, the display being configured to output position information including a moving path of each of the first cleaner and the second cleaner based on receiving the position information transmitted from the first and second cleaners via wireless communication during the first and second cleaning operations.

2. The cleaner system of claim 1, wherein the housing has a quadrangular column shape having a major axis that extends in an up-down direction, and
   wherein the display is disposed at a top surface of the housing.

3. The cleaner system of claim 1, wherein the cleaner station is configured to store drawing information corresponding to a space in which the cleaner station is installed.

4. The cleaner system of claim 3, wherein the cleaner station is configured to:
   communicate wirelessly with at least one appliance disposed in the space in which the cleaner station is installed;

update the drawing information based on receiving position information of the at least one appliance; and
output the updated drawing information through the display.

5. The cleaner system of claim 3, wherein the first cleaner is configured to, based on performing the first cleaning operation, transmit the position information including the moving path of the first cleaner to the cleaner station, and
wherein the cleaner station is configured to update the drawing information based on receiving the position information of the first cleaner and to output the updated drawing information through the display.

6. The cleaner system of claim 5, wherein the cleaner station is configured to transmit the drawing information including the updated position information of the first cleaner to the second cleaner.

7. The cleaner system of claim 3, wherein the second cleaner is configure to, based on performing the second cleaning operation, transmit the position information including the moving path of the second cleaner to the cleaner station, and
wherein the cleaner station is configured to update the drawing information based on receiving the position information of the second cleaner and to output the updated drawing information through the display.

8. The cleaner system of claim 1, wherein the cleaner station further comprises a controller configured to control the display and to communicate with the first cleaner and the second cleaner.

9. The cleaner system of claim 1, wherein the cleaner station further comprises a top cover coupled to the housing and disposed at an upper end of the housing, and
wherein the display is disposed at the top cover or at a side surface of the housing.

10. The cleaner system of claim 1, wherein the housing defines a top opening that is open in an upward direction, and
wherein the top cover is coupled to one side of the top opening of the housing by a hinge, the top cover being configured to rotate relative to the housing about the hinge.

11. A cleaner station configured to collect dust discharged from a dust bin of a cleaner, the cleaner station comprising:
a housing that has a quadrangular column shape and defines an inner space configured to collect the dust, the housing having a major axis that extends in an up-down direction;
a coupling portion disposed at a surface of the housing parallel to the major axis of the housing, the coupling portion being recessed and configured to couple to a portion of the cleaner;
a top cover coupled to the housing and disposed at an upper end of the housing; and
a display configured to output an operation state of the cleaner station,
wherein the display is disposed at the top cover or at a side of the coupling portion.

12. The cleaner station of claim 11, further comprising an operation unit disposed at the top cover and configured to receive a user command for operating the cleaner station.

13. The cleaner station of claim 11, wherein the housing defines a top opening that is open in the up-down direction, and
wherein the top cover is coupled to one side of the top opening of the housing by a hinge, the top cover being configured to rotate relative to the housing about the hinge.

14. The cleaner station of claim 13, wherein the hinge is coupled to a surface of the housing that is disposed at a position opposite to the coupling portion.

15. A method for controlling a cleaner system, the cleaner system including a cleaner station configured to couple to a plurality of cleaners, the method comprising:
receiving first position information including a first moving path of a first cleaner among the plurality of cleaner, the first cleaner being configured to perform a first cleaning operation by a user;
receiving second position information including a second moving path of a second cleaner among the plurality of cleaner, the second cleaner being configured to perform autonomously perform a second cleaning operation; and
displaying, through a display disposed at the cleaner station, the first position information and the second position information during the first cleaning operation and the second cleaning operation.

16. The method of claim 15, further comprising:
storing drawing information corresponding to a space in which the cleaner station is installed.

17. The method of claim 16, further comprising:
communicating wirelessly with at least one appliance disposed in the space in which the cleaner station is installed;
updating the drawing information based on receiving position information of the at least one appliance; and
outputting the updated drawing information through the display.

18. The method of claim 16, further comprising:
updating the drawing information based on receiving the first position information of the first cleaner, and outputting the updated drawing information through the display.

19. The method of claim 16, further comprising:
updating the drawing information based on receiving the second position information of the second cleaner, and transmitting the updated drawing information through the display.

20. The method of claim 15, further comprising:
transmitting the first position information of the first cleaner to the second cleaner.

\* \* \* \* \*